(12) United States Patent
Yajima et al.

(10) Patent No.: US 7,486,276 B2
(45) Date of Patent: Feb. 3, 2009

(54) KEY EVENT CONTROLLING APPARATUS

(75) Inventors: Hideaki Yajima, Osaka (JP); Masaki Horiuchi, Katano (JP)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 10/508,653

(22) PCT Filed: Oct. 2, 2003

(86) PCT No.: PCT/JP03/12627

§ 371 (c)(1),
(2), (4) Date: Sep. 22, 2004

(87) PCT Pub. No.: WO2004/034257

PCT Pub. Date: Apr. 22, 2004

(65) Prior Publication Data
US 2005/0177797 A1 Aug. 11, 2005

(30) Foreign Application Priority Data
Oct. 3, 2002 (JP) ............................ 2002-290902

(51) Int. Cl.
*G06F 3/02* (2006.01)
(52) U.S. Cl. ...................... 345/168; 715/781
(58) Field of Classification Search ............. 710/62–74; 345/168–172
See application file for complete search history.

(56) References Cited

U.S. PATENT DOCUMENTS

| 4,896,290 A | * | 1/1990 | Rhodes et al. | ................. 710/67 |
| 5,525,978 A | * | 6/1996 | York et al. | ................. 341/22 |
| 5,675,329 A | | 10/1997 | Barker et al. | |
| 6,069,628 A | | 5/2000 | Farry et al. | |

FOREIGN PATENT DOCUMENTS

EP 0 538 705 4/1993

(Continued)

OTHER PUBLICATIONS

"Xwindow Handbook", Introduction to the X Window System, ASCII Corporation, Jun. 1, 1990, Oliver Jones, supervised by Ryo Nishimura, translated by Akemi Miura, pp. 394-410 and 455-466.

(Continued)

*Primary Examiner*—Bipin Shalwala
*Assistant Examiner*—Kenneth B Lee, Jr.
(74) *Attorney, Agent, or Firm*—Wenderoth, Lind & Ponack, L.L.P.

(57) ABSTRACT

A grab accepting section receives a request from a grab window to grab a desired key event over a focus window. A grab requesting section which retains key event request sets that may be issued until the time a key event corresponding to the user's operation result is ascertained, requests a window system to notify all of the key events belonging to the key event request set which includes the key event that the grab window desires to acquire. Thus, in a situation where operation results of a key, which is assigned with a plurality of functions, are notified as different virtual key events for the respective functions depending on the manner the key is operated, malfunctioning due to the grab window grabbing a particular key event via the window system is avoided.

10 Claims, 18 Drawing Sheets

FOREIGN PATENT DOCUMENTS

| | | |
|---|---|---|
| GB | 2 349 725 | 11/2000 |
| JP | 02-015326 | 1/1990 |
| JP | 2-139625 | 5/1990 |
| JP | 2-139626 | 5/1990 |
| JP | 02-151128 | 6/1990 |
| JP | 7-69777 | 7/1995 |
| JP | 8-050542 | 2/1996 |
| JP | 2000-259313 | 9/2000 |
| JP | 2000-353357 | 12/2000 |
| JP | 2003-162356 | 6/2003 |

OTHER PUBLICATIONS

"The Official FVWM Homepage", Jul. 20, 2002, searched as of Sep. 9, 2002, <URL:http://www.fvwm.org>.

R. W. Scheifler et al., "The X Window System", ACM Transactions on Graphics, Association for Computing Machinery, New York, NY, U.S., vol. 5, No. 2, Apr. 1, 1986, pp. 79-109, XP000565891, ISSN:0730-0301, p. 102, lines 3-7.

* cited by examiner

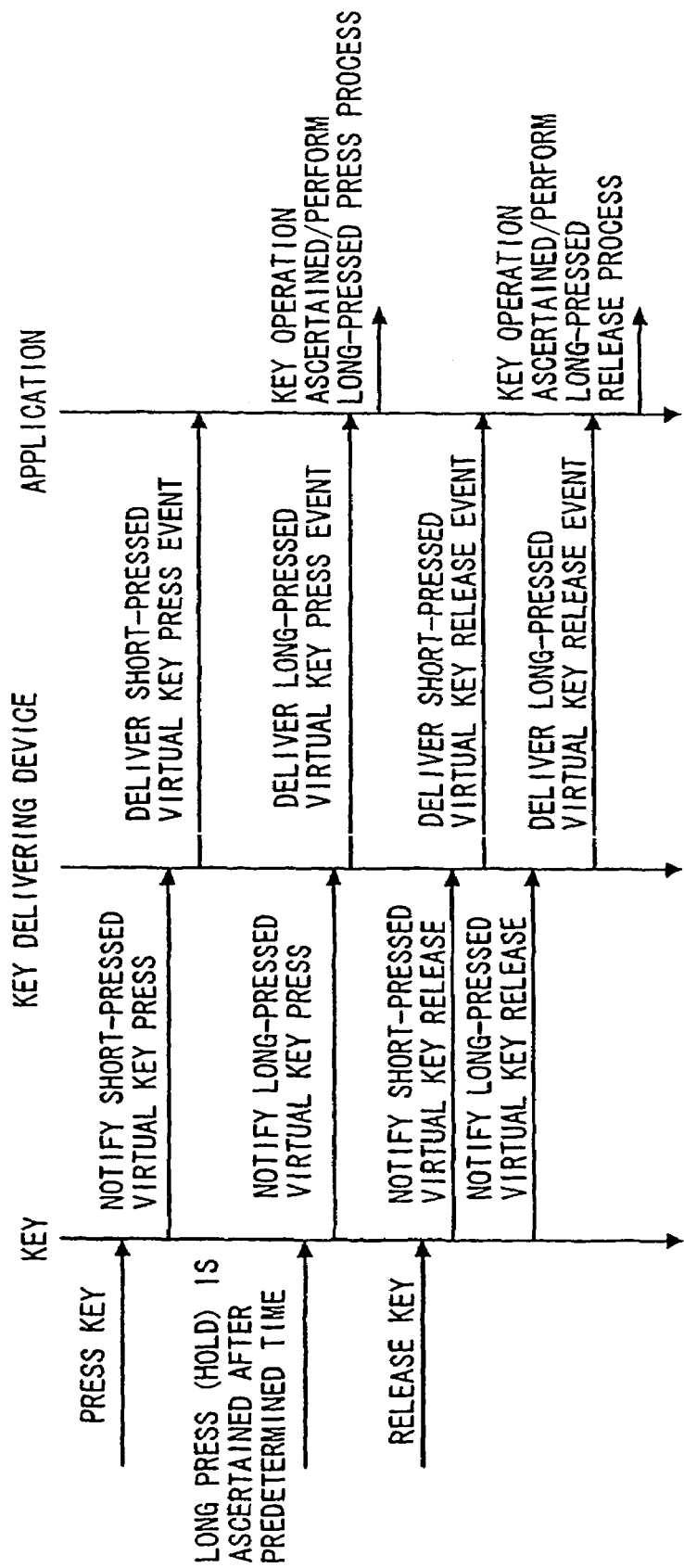
F I G. 21 - PRIOR ART

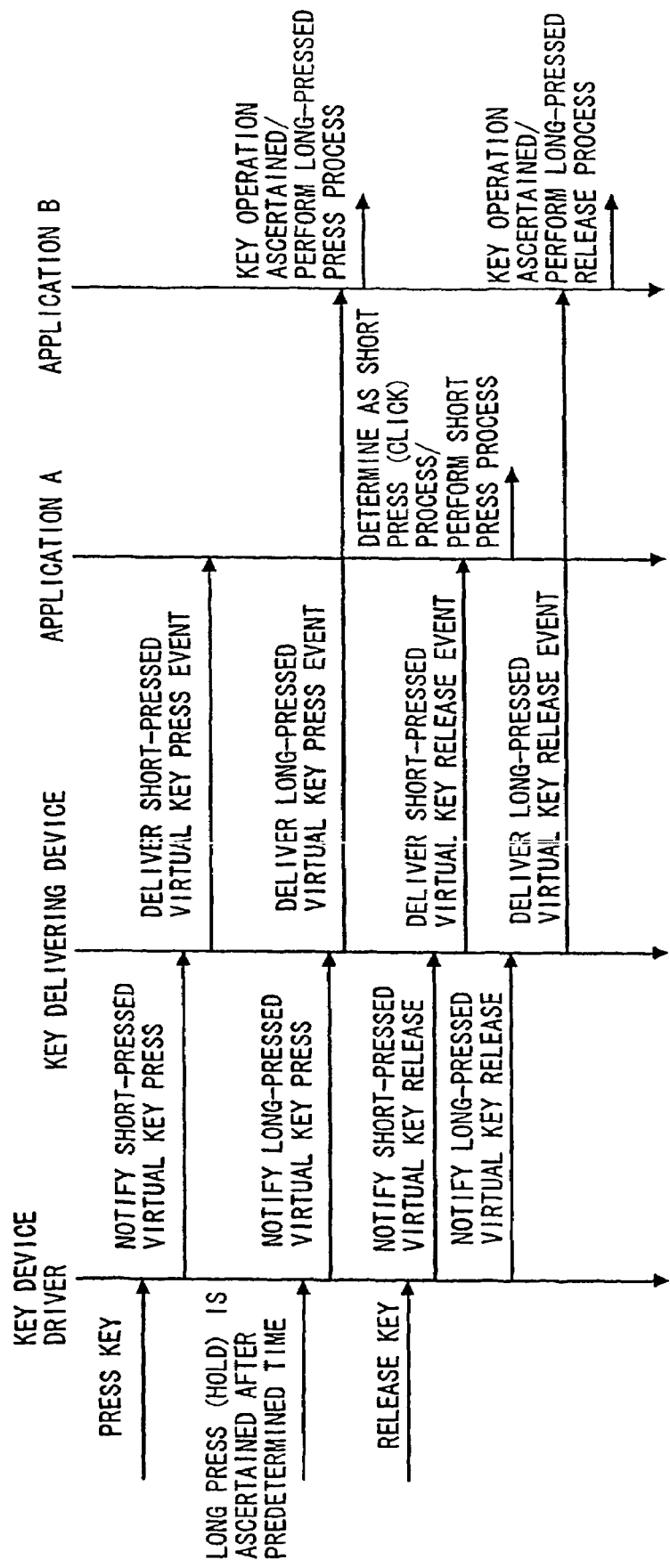
FIG. 22 - PRIOR ART

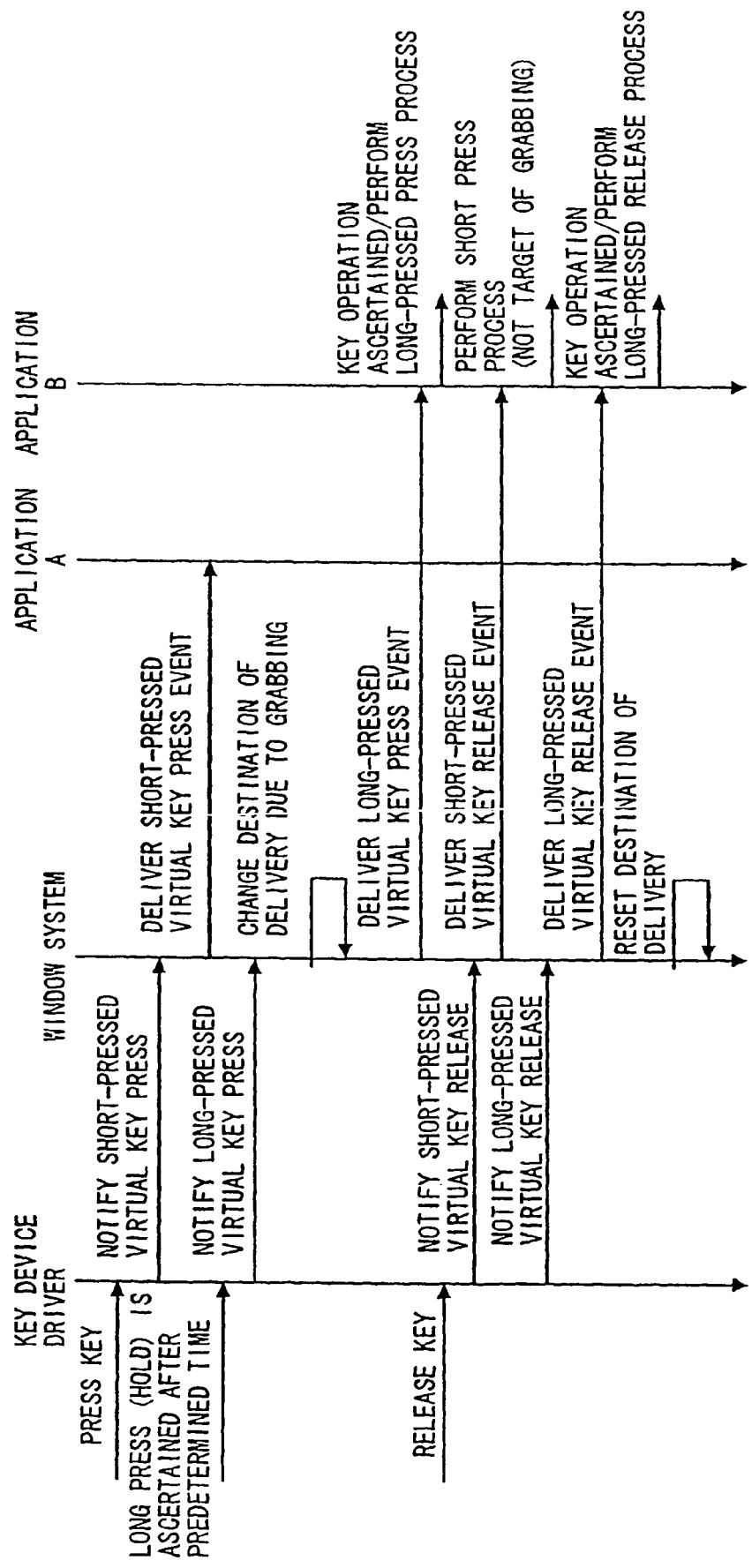
FIG. 23 - PRIOR ART

KEY EVENT CONTROLLING APPARATUS

BACKGROUND OF THE INVENTION

1. Field of the Invention

The present invention relates to a key event controlling apparatus, and more relates particularly to a key event controlling apparatus for changing the destination to deliver specific key events and performing filtering of key events.

2. Background of the Related Art

In a window system such as XWindowSystem™ (a registered trademark of Massachusetts Institute of Technology), which is a popular mechanism for managing key states and notifying changes in the states, a virtual key event is issued when a modifier key such as a shift key or a control key is combined with another key, in accordance with the key operation (see, for example, "XWindow handbook", ASCII corporation, 1990", Oliver JONES, supervised by Ryo NISHIMURA, translated by Akemi MIURA, (hereinafter referred to as "Non-patent Document 1")).

A technique of event managing on a window system that handles a plurality of windows is a multi-window event management device which realizes automatic switching of a focus window, as a destination to which to notify events, by universally managing information concerning window control (see, for example, Japanese Patent Laid-Open Publication No. 2-139626 (hereinafter referred to as "Patent Document 1")).

However, the techniques described in Non-patent Document 1 and Patent Document 1 do not take into consideration the case where functional assignments of keys are to be changed based on the periods of time for which the keys are pressed, e.g., a short press (a so-called "click") or a long press (a so-called "hold"), or based on the ways of operating keys, e.g., a half press or a full press.

An example of mechanism for changing functional assignments of keys based on the periods of time for which the keys are pressed, e.g., the short press or the long press, is a mechanism which notifies different events in accordance with the key operation, depending on whether it is a short press or a long press (see, for example, Japanese Patent Laid-Open Publication No. 2000-353357 (hereinafter referred to as "Patent Document 2")).

In the situation where different functions are to be assigned in accordance with the key operation depending on whether it is a short press or a long press, there may be a case where it is desirous to suppress short press events once a long press has been ascertained. There may also be a case where short press events need to be notified even after a long press has been ascertained. In the case where a certain operation is to be performed when a key is first pressed, and a next operation is to be performed when a long press is ascertained thereafter, it would be necessary to notify short events even after a long press has been ascertained. One example thereof would be the case where a scroll is begun when a key is pressed, and the scroll speed is increased when a long press has been ascertained (see, for example, Japanese Patent Laid-Open Publication No. 2003-162356).

In this case, the key delivering device functioning to notify changes in the states of keys would notify the state of the corresponding key or virtual key in the middle of a key operation, even before a corresponding virtual key is determined following completion of a series of key operations. For example, a sequence in the case where a virtual key "long-pressed key" and a virtual key "short-pressed key" are assigned to a long press and a short press of a given key is shown in FIG. 21, where it is assumed that the key is long-pressed. First, at the time the key is pressed, the key delivering device notifies a change in the state of the "short-pressed" virtual key. Neither the short-pressed key nor the long-pressed key is unequivocally ascertained at the time of this key pressing, since it is still in the middle of the key operation. Thereafter, once a certain period of time elapses with the key being pressed, thereby resulting in the ascertainment of a long press operation, this method notifies a change in the state of the "long-pressed" virtual key. According to the above method, each application receives a notification of a virtual key event even before the ascertainment of a key operation. Therefore, according to this method, a received series of virtual key events are subjected to a comprehensive determination at the application side to determine which key event has been ascertained, and a corresponding process is performed.

As for grabbing of key events, the widely-prevalent XWindowSystem realizes it as follows. When a key that is a target of grabbing is pressed, the destination to which to deliver the key event is switched from an application which is active to that which has requested grabbing, and the delivery path is brought back to normal when the key is released (see, for example, the aforementioned Non-patent Document 1).

There may also be a case where a user performs a process for not only a particular application but all existing applications. A specific example would be the case where all applications close, minimize, or maximize the screens displayed thereby. In such a case, since generally-used window systems do not have a mechanism for delivering key events to all windows, a window manager for managing windows is provided, such that a universal operation request is notified to the window manger, which, having received the above, performs operations to all windows. However, the operations to be performed to all windows by a generally-used window manager, such as FVWM, are limited to operations concerning the windows themselves, e.g., maximize or minimize window, due to the nature of window managing (see, for example, David Fries, et al., "The Official FVWM Homepage", Jul. 20, 2002, searched as of Sep. 9, 2002, <www.fvwm.org>").

As a complement to the above, there exists an input device which, when text characters are to be simultaneously inputted to a plurality of windows, outputs the respective input characters to corresponding windows by referring to a character-window correspondence table which describes correspondence between inputted characters and destination windows where the inputted characters are to be inputted (see, for example, Japanese Patent Laid-Open Publication No. 8-50542).

However, the aforementioned conventional technique has a first problem in that, when a plurality of key events which are issued through a series of key operations are delivered, as a result of grabbing of key events, to both an application which is designated by the user or an application to be the destination of key event delivery (hereinafter referred to as the "active application") and the application which is a recipient of presidential delivery (hereinafter referred to as the "grabbing application"), only a portion of the series of key operations is notified to each application, thereby making it impossible to accurately ascertain the function, so that the system may perform an unexpected operation.

For instance, a sequence in the case where "long-pressed" and "short-pressed" virtual keys are assigned to a given key, and application A is an active application and application B is a grab application for the "long-pressed" virtual key, is shown in FIG. 22, where it is assumed that the key is long-pressed. First, when the key is pressed, a "short-pressed" virtual key press event is notified to application A. Next, a "long-pressed" virtual key press event is notified to application B.

Thereafter, when the key is released, a "short-pressed" virtual key release event is notified to application A, and a "long-pressed" virtual key release event is notified to application B. Although the key operation would prove to be a long press once all of the series of four virtual key events are received, application A has only received a notification of the "short-pressed" virtual key event; therefore, it will perform a process corresponding to a short press although the user has not performed a short press operation.

It might be conceivable to solve the aforementioned problem, where "long-pressed" and "short-pressed" virtual keys are assigned to a key, by not issuing a press event at the time the key is pressed because the user's operation result cannot be ascertained, and only issuing a "long-pressed" or "short-pressed" virtual key release event corresponding to the operation result at the time of the key release, when the key operation result becomes ascertained. However, since this method does not issue a keypress event for any key that supports a long press, different types of key event will be issued between keys which do not support long-press operation and keys which support long-press operation. This results in a problem in that, each time a key which supports long-press operation is altered, any application which is to process key events concerning it would also have to be altered. In order to cope with this problem, it might be conceivable to not issue key press events even for keys which do not support long-press operation, but such a method will introduce a delay in the key events for every key, thus detracting from the operability on the part of the user.

There is also a second problem in that, when a specific key is to be grabbed in a generally-used window system such as XWindowSystem, the delivery destination of key events is switched to the recipient of precedential delivery once that key is pressed and until the time it is released. Therefore, depending on the order of virtual key delivery, those key events which are not even the target of grabbing may also be delivered to the recipient of precedential delivery.

For instance, a sequence in the case where "long-pressed" and "short-pressed" virtual keys are assigned to a given key, and application A is an active application and application B is a grab application which grabs the "short-pressed" virtual key, is shown in FIG. 23, where it is assumed that the key is long-pressed. Since the key events from the "long-pressed" virtual key press event to the "long-pressed" virtual key release event are to be delivered to application B, if the virtual key events are issued in the order of a "short-pressed" virtual key press event, a "long-pressed" virtual key press event, a "short-pressed" virtual key release event, and a "long-pressed" virtual key release event, even the "short-pressed" virtual key release event will be sent to application B. This means that no key release will be notified to application A.

A possible method for preventing such an improper delivery of key events due to grabbing might be not performing any grabbing, so that key events are always delivered to the active application, where the active application subjects the delivered key events to a comprehensive determination to switch processing or notify to other applications. However, this has a problem in that, if it is desirous to perform a particular process for a particular key operation over the entire system in a unified manner, it will be necessary for every application which can potentially become an active application to support the above improvement, which would result in an increase in the development overhead. Moreover, in the case where an application which does not support the above improvement is introduced, e.g., an open application which has been developed by a third party, any key operation related to the above improvement will prove invalid on such an application. For example, in the case where the entire system is to universally transition to a manner mode in response to a long press of a manner key, every application will need to handle the processing of manner mode transition in response to the notification of a long press of the manner key. Furthermore, on a downloaded piece of open software which does not include a description of the above processing, the long press of the manner key will be invalid, or a different process may be performed.

There is also a third problem in that, in a generally-used window system such as XWindowSystem, in order to avoid conflicts between grabbings, only the window which was the first to make a request is allowed to become a recipient of presidential delivery for a given key. In other words, it is not possible for a plurality of windows to grab key events concerning the same key at the same time.

There is also a fourth problem in that, in the case where the user wishes to perform a universal process for all windows, with the aforementioned conventional technique in which a window manager is in charge of management and control, it is impossible to perform any process which is not an operation concerning the windows themselves for all windows, e.g., a process of undoing an immediately previous operation and restoring the immediately preceding state, or a data save process.

The earlier-mentioned conventional technique concerning an input device directed to a plurality of windows (e.g., see Patent Document 2 above) only envisages text input; furthermore, a notified text input is delivered to a plurality of windows merely in accordance with a character-window correspondence table. Therefore, in the case where a plurality of key events are generated during the user's key operation process, all of the generated key events will be respectively delivered to the corresponding windows, thus resulting in the aforementioned first problem of the system performing an unexpected operation.

BRIEF DESCRIPTION OF THE INVENTION

The present invention was made in order to solve at least the aforementioned first problem and the second problem (and also the third and fourth problems according to some variants thereof), and an object thereof is to provide a key event controlling apparatus which, in an environment including a plurality of windows, delivers key events which are ascertained on the basis of a plurality of key events occurring during the user's key operation process to a window which is a recipient of precedential delivery or a focus window.

The key event controlling apparatus according to the present invention comprises: a grab accepting section for accepting a request from a first recipient program (e.g., the aforementioned grab application) to grab a desired key event instead of a second recipient program (e.g., the aforementioned active application) which is a usual recipient of key events from a key delivering device (e.g., the aforementioned key delivering device); and a grab requesting section for retaining at least one key event request set composed of a plurality of key events which may be issued until the time a key event corresponding to a result of a key operation by a user is ascertained, and requesting the key delivering device to notify to the key event controlling apparatus all of the key events belonging to one of the at least one key event request set which includes the desired key event.

According to the present invention, a single key event controlling apparatus universally acquires all of the events concerning a plurality of keys which are issued through a series of key operations, whereby the malfunctioning due to a delivery which is split between a focus window and a window which is a recipient of precedential delivery can be prevented.

According to various variants of the present invention, the following effects can be obtained.

It is possible to prevent the problem of grabbing key events which are not even targets of grabbing, and the problem in that a plurality of windows cannot grab the same key event, which are due to the design of the precedential key acquisition mechanism of a generally-used window system.

From the above, grabbing of key events becomes available to applications even in an environment where key functions will vary depending on the key operation. Therefore, in the case where it is desirous to perform a particular process for a particular key operation over the entire system in a unified manner, it suffices if the one application which grabs that key event is modified to support such, and any special processing on the other existing applications is unnecessary. Thus, unified processing can be performed over the entire system, even on an application such as a downloaded piece of open software or the like.

By broadcasting a particular event to all windows, it becomes possible for the user to universally perform, on all windows, processes other than window operations, which would not be supported by a window manager.

Furthermore, in the case of applying the present invention to an existing system, one only needs to additionally introduce the key event controlling apparatus, without having to modify the window system. Therefore, it is possible to make use of a generally-used window system, so that the software development scale, development cost, and the number of steps to be developed can be reduced.

BRIEF DESCRIPTION OF THE DRAWINGS

FIG. 21 is a process sequence diagram of a conventional technique, in the case where "long-pressed" and "short-pressed" virtual keys are supported.

FIG. 22 is a process sequence diagram of a conventional technique, in the case where malfunctioning of a short press processing occurs.

FIG. 23 is a process sequence diagram of a conventional window system, in the case where an improper delivery of key events which are not targets of grabbing occurs.

DETAILED DESCRIPTION OF THE INVENTION

Hereinafter, embodiments of the present invention will be described with reference to the figures.

Although the embodiments describe the case where a window system is adopted as a key delivering device, the present invention is also applicable to the case where a key delivering device other than a window system is employed, e.g., a mechanism which notifies changes in the states of keys during inter-task communications in a real-time OS. Delivery targets of keys are not limited to windows, but may be any programs (including applications, child windows, or the like).

EMBODIMENT 1

Figure 1:
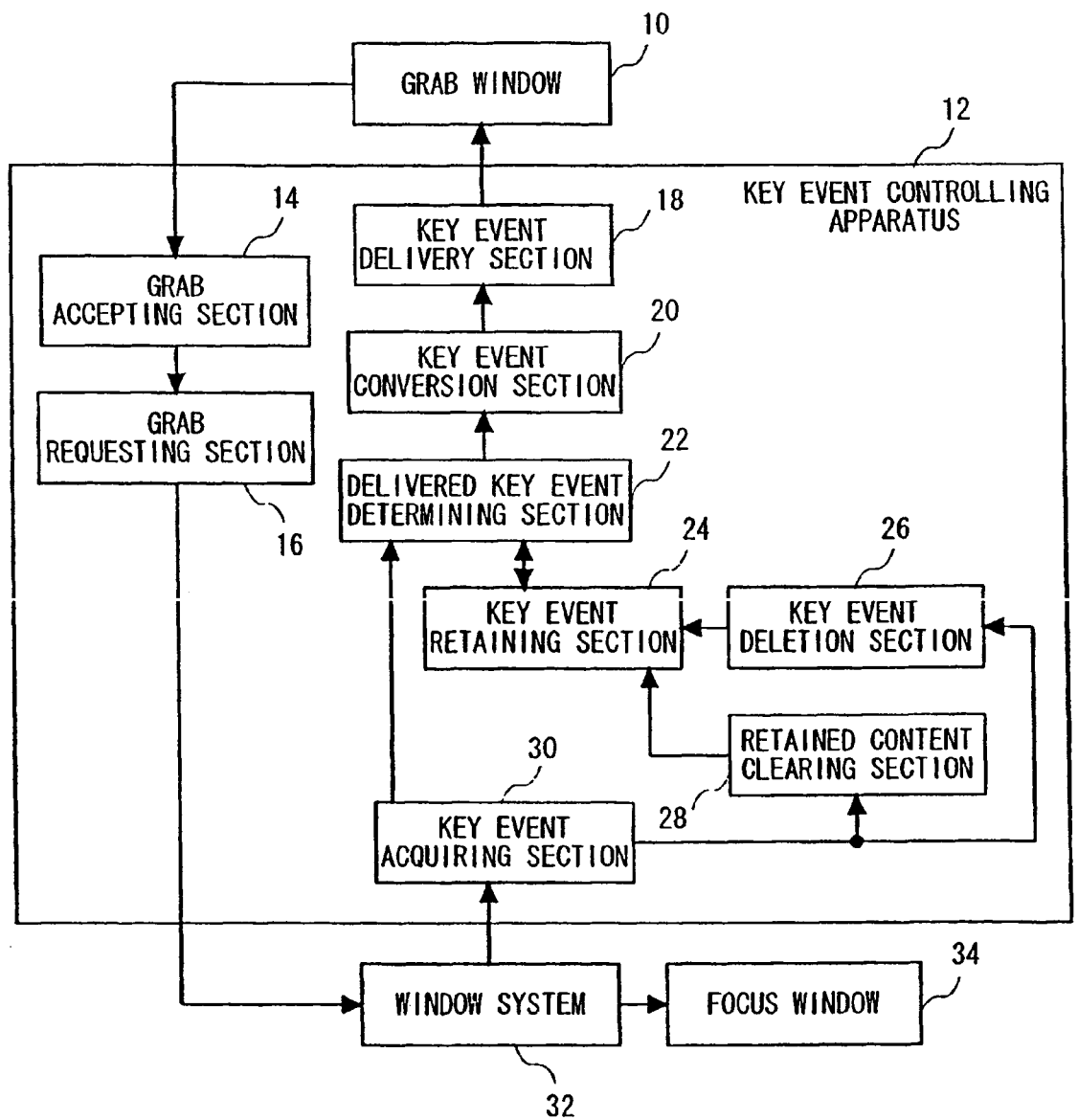
FIG. 1 is a block diagram illustrating an exemplary configuration of a key event controlling apparatus according to Embodiment 1 of the present invention.

As Embodiment 1 of the present invention, a case where the key event controlling apparatus performs a key event grab requesting process and a key event filtering process is illustrated in FIG. 1.

FIG. 1 is a block diagram illustrating an exemplary configuration of the key event controlling apparatus according to Embodiment 1 of the present invention.

A window system 32, which is an example of a key delivering device, has the function of delivering key events to predetermined windows. Although the window system 32 usually delivers key events to a focus window 34, the window system 32 also functions to deliver specific key events to specific windows. The focus window is a window which has been designated by a user or an application to be a delivery destination of key events.

In the present embodiment, although the window system 32 usually delivers key events to the focus window 34, some key events are notified from the window system 32 to a grab window 10, via the key event controlling apparatus 12. Herein, the grab window 10 is a window which has requested grabbing of a specific key event from the key event controlling apparatus 12. The grab window 10 may be the focus window 34.

The key event controlling apparatus 12 in FIG. 1 comprises a grab accepting section 14, a grab requesting section 16, a key event delivery section 18, a key event conversion section 20, a delivered key event determining section 22, a key event retaining section 24, a key event deletion section 26, a retained content clearing section 28, and a key event acquiring section 30.

First, a key event grab requesting process will be described.

The grab accepting section 14 accepts a grab request from the grab window 10 (including information indicating which key event is to be grabbed), stores this request, and notifies to the grab requesting section 16 that a grab request has been accepted.

Figure 2:
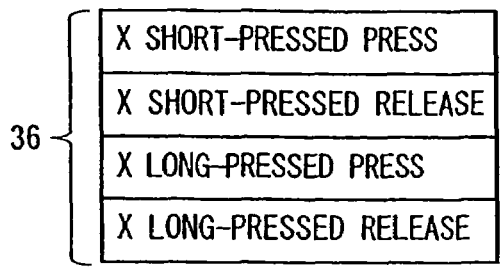
FIG. 2 is a diagram illustrating an exemplary key event request set according to the present invention.

The grab requesting section 16 previously retains a key event request set 36, which is composed of a plurality of key events as exemplified in FIG. 2. The grab requesting section 16 may retain a plurality of key event request sets. If the key events which are targets of grabbing as notified from the grab accepting section 14 belongs to any of the key event request sets retained by the grab requesting section 16, the grab requesting section 16 places a request to the window system 32 to grab all of the key events belonging to that key event request set.

Each key event request set is composed of a plurality of key events which may be issued until the time a key event corresponding to the user's operation result is ascertained.

For instance, if there is a long-pressed key event and a short-pressed key event which respectively notify a long press (so-called "hold") operation and a short press (so-called "click") operation for key X, and if the user has long-pressed key X, an X short-pressed key press event is issued from the window system 32 when the user has pressed key X. Thereafter, when a long press has been ascertained after the lapse of a certain period of time, an X long-pressed key press event is issued from the window system 32. Then, when the user has let go of (i.e., released) key X, an X short-pressed key release event and an X long-pressed key release event are issued from the window system 32. Thus, a short-pressed key event is also issued during the user's long press key operation. The grab requesting section 16 retains all of the above four key events which are issued in a long press key operation as a key event request set 36, as shown in FIG. 2. If a grab request for any of the above four key events included in the key event request set 36 is made by the grab window 10, the grab requesting section 16 places a request to the window system 32 to grab all of the above four key events included in the key event request set 36.

Figure 3:
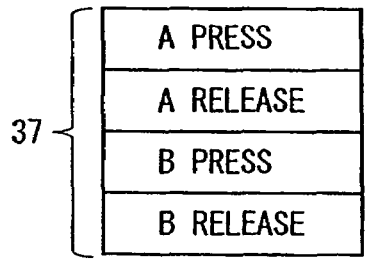
FIG. 3 is a diagram illustrating another exemplary key event request set according to the present invention.

For another instance, in the case where a virtual key event is to be issued when two keys A and B are simultaneously pressed, such that the virtual key event is different from that which is issued when key A or key B alone is pressed, the grab requesting section 16 retains the four key events which may be issued during such a simultaneous press operation (A press, A release, B press, B release) key event request set 37, as shown in FIG. 3. If grabbing is made with respect to any of these four key events, the grab requesting section 16 request the window system 32 to grab all of the above four key events included in the key event request set 37.

The grab requesting section 16 may be retaining the key event request set 36 shown in FIG. 2 and the key event request set 37 shown in FIG. 3 at the same time.

Once the key event controlling apparatus 12 places a request to the window system 32 to grab specific key events, the window system 32 will thereafter notify such specific key events to the key event controlling apparatus 12, and notify any other key event to the focus window 34. As a result, the key event controlling apparatus 12 will universally acquire all of the key events which are issued during a specific key operation, thereby preventing any malfunctioning due to a series of key events issued during a key operation being delivered in a split manner between a focus window and a window which is a recipient of precedential delivery (grab window).

Next, a key event filtering process will be described.

The key event acquiring section 30 acquires a key event which has been notified from the window system 32, and notifies that key event to the delivered key event determining section 22. At the same time, the key event acquiring section 30 notifies to the key event deletion section 26 and the retained content clearing section 28 that an acquisition of a key event has occurred. The key event acquiring section 30 may make this notification by using a certain event indicating that an acquisition of a key event has occurred, or use the acquired key event itself for notification.

The delivered key event determining section 22 receives the key event from the key event acquiring section 30, stores the key event to the key event retaining section 24, and determines the key event to be delivered. When the key event to be delivered has been unequivocally ascertained, the delivered key event determining section 22 notifies this ascertained key event to the key event conversion section 20, and clears this ascertained key event which is stored in the key event retaining section 24. Only if the key event to be delivered is not unequivocally ascertained, may the delivered key event determining section 22 store the key event received from the key event acquiring section 30 to the key event retaining section 24. The details of the key event retaining section 24 will be described later.

Figure 4:
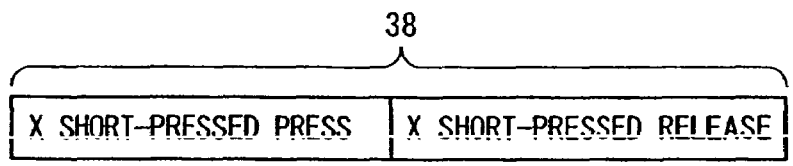
FIG. 4 is a diagram illustrating an exemplary key event ascertainment set according to the present invention.

In determining the key event to be delivered, the delivered key event determining section 22 uses a previously-set key event ascertainment set as determination criteria for the determination. The key event ascertainment set is composed of a plurality of key events for ascertaining key operations, which cannot be ascertained based on a single key event only. For example, if a short press operation and a long press operation are possible for a given key X, a user's key operation cannot be unequivocally ascertained to be either a short press operation or a long press operation when an X short-pressed key press event has just been issued from the window system 32. In other words, the user's key operation can only be determined to be a short press operation when both an X short-pressed key press event and an X short-pressed key release event have been secured. Accordingly, this pair consisting of an X short-pressed key press event and an X short-pressed key release event is previously retained as a key event ascertainment set 38 in the delivered key event determining section 22, as shown in FIG. 4. As for the long press operation, the user's key operation can be determined to be a long press operation as soon as an X long-pressed key press event is issued alone, and therefore no key event ascertainment set is necessary that is directed to the long press operation. A plurality of key event ascertainment sets may be set in the delivered key event determining section 22.

Figure 5:
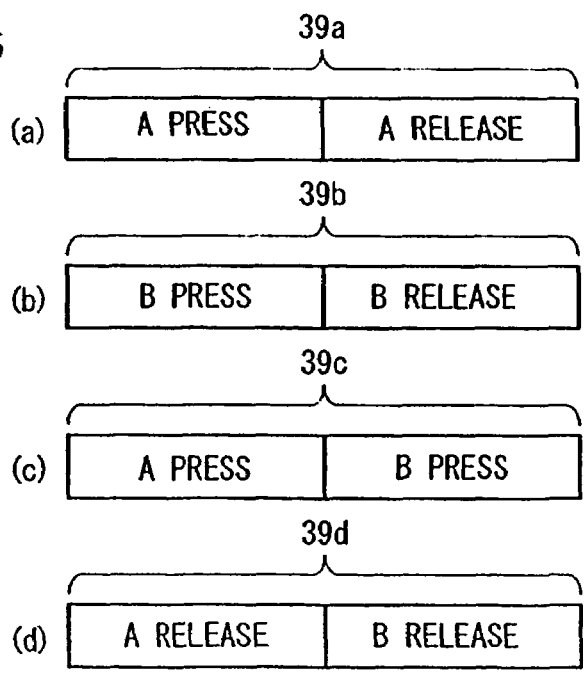
FIG. 5 is a diagram illustrating another exemplary key event ascertainment set according to the present invention.

As another example of a key event ascertainment set, in the case where a virtual key event (X press) is to be issued when two keys A and B are simultaneously pressed, such that the virtual key event is different from that which is issued when key A or key B alone is pressed, four key event ascertainment sets 39a, 39b, 39c, and 39d as shown in (a) to (d) of FIG. 5 are set in the delivered key event determining section 22. In this case, the pair consisting of an A key press event and a B key press event is converted to an X key press event by the key event conversion section 20, and the pair consisting of an A key release event and a B key release event is converted to an X key release event. The pair consisting of an A key press event and an A key release event, and the pair consisting of a B key press event and a B key release event are not converted.

Figure 6:
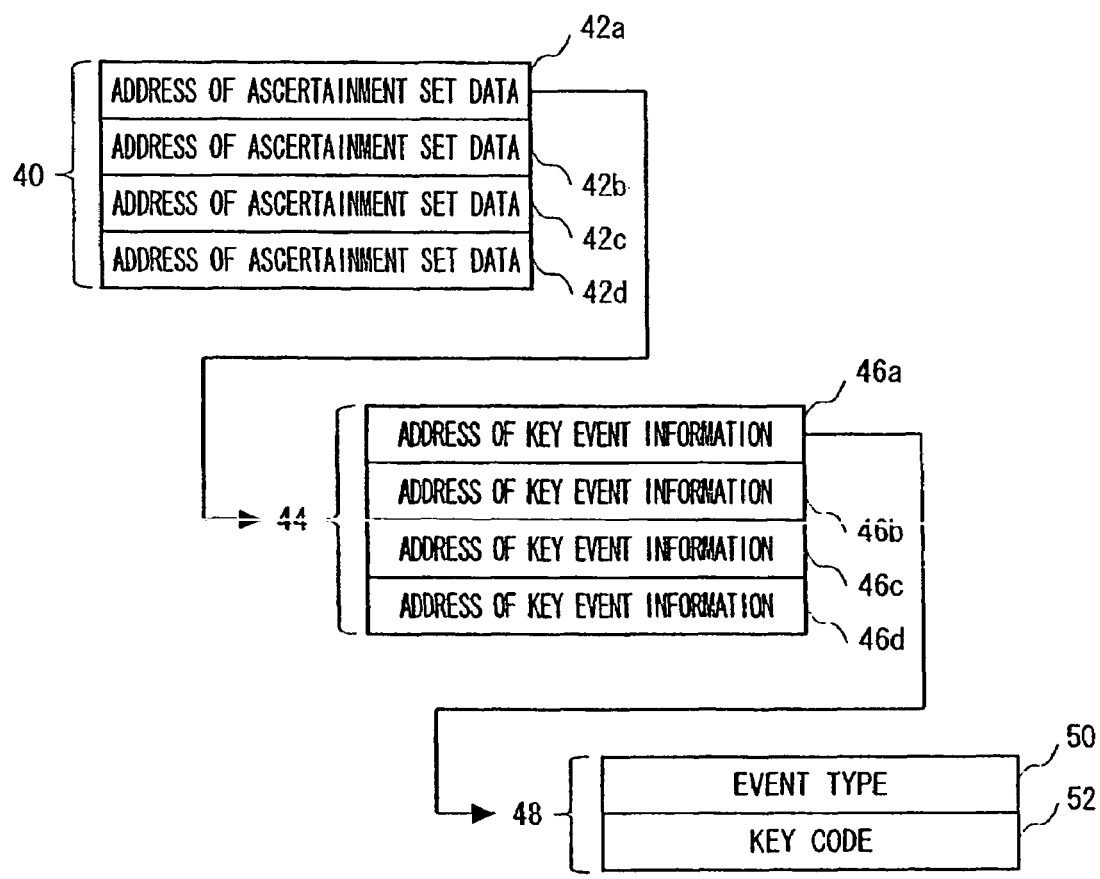
FIG. 6 is a diagram illustrating an exemplary data structure of a key event ascertainment set according to the present invention.

FIG. 6 illustrates an exemplary data structure of a key event ascertainment set which is set in the delivered key event determining section 12. Setting management information 40 contains a list of addresses 42a, 42b, 42c, 42d of a plurality of key event ascertainment set data 44 which are set. Each key event ascertainment set data 44 contains addresses 46a, 46b, 46c, and 46d of key event information 48, which indicates information concerning the respective key events belonging to that set. The key event information 48 contains, as information for specifying a key event, key event type 50 indicating the type of the event, e.g., press or release, and a key code 52 indicating which key the event corresponds to. The key event information 48 may be any information that is capable of specifying a key event. Instead of describing the key event type 50 and the key code 52 as key event information 48, an ID may be assigned to each key event, and the ID may be described as key event information 48. As for the manner of setting the key event ascertainment sets, the key event ascertainment sets may be statically incorporated at the time of system development, or may be dynamically set at any arbitrary timing, depending on the needs of the application. The key event ascertainment set is set so that its constituents are key events for which a key operation result would not be ascertainable based on a single key event alone, and so as to include all key events which are necessary for the key operation to be ascertained.

Figure 7:
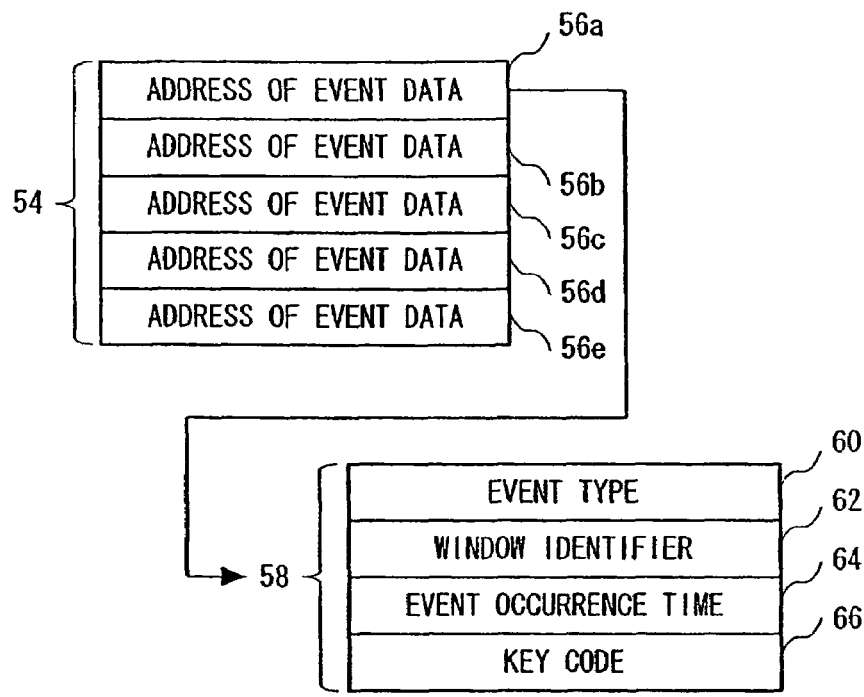
FIG. 7 is a diagram illustrating an exemplary data structure of a key event retaining section according to the present invention.

The key event retaining section 24 temporarily retains at least key events for which a key operation result would not be ascertainable based on a single key event alone, and is implemented as a storage device, such as a memory, which is capable of temporarily retaining the key events to be retained. FIG. 7 illustrates an exemplary data structure of the data retained in the key event retaining section 24. In the retained data 54 is retained a list of addresses 56a, 56b, 56c, 56d, 56e of event data 58 to be retained. Each event data 58 contains a key event type 60 indicating the type of the event, e.g., press or release, a window identifier 62 for identifying the focus window at the time that event has occurred, an event occurrence time 64, and a key code 66 indicating which key the event corresponds to. However, this event data 58 depends on the specifications of the window system 32 which notifies events, so that any of the aforementioned key event type 60, window identifier 62, event occurrence time 64, key code 66 that is unnecessary may be eliminated therefrom. Moreover, the event data 58 may contain coordinates on a screen at which the event has occurred, an screen identifier for specifying a screen in the case where a plurality of screens exist, and the like.

In the case only the key events for which a key operation result would not be ascertainable based on a single key event alone are stored to the key event retaining section 24, the key events to be retained by the key event retaining section 24 are limited to the key events contained in any of the key event ascertainment sets which are set in the delivered key event determining section 22.

The key event conversion section 20 converts the key events which have been determined by the delivered key event determining section 22 to other key events. The method of converting key events include: combining a plurality of key events so as to be converted to one other key event; converting a single key event to a plurality of key events; converting a single key event to another key event; and the like. Combining a plurality of key events may be, in the case where a RIGHT key press event and an UP key press event have been determined to be the key events to be delivered, for example, converting these two key events to a UPPER RIGHT key press event. Conversion of a single key event to a plurality of key events is a reverse of the above example, e.g., converting a UPPER RIGHT key press event to a RIGHT key press event and an UP key press event. Conversion of a single key event to another key event may be, for example, converting a RIGHT key press event to an UP key press event. Such conversions can be realized by previously setting conversion rules in the key event conversion section 20 as exemplified in the above examples, and converting, by means of the key event conversion section 20, the key events which have been determined by the delivered key event determining section 22 as the key events to be delivered, the conversion being made in accordance with the conversion rules. The key event conversion section 20 does not necessarily convert all key events. As for key events which are not targets of conversion, the key event conversion section 20 notifies them to the key event delivery section 18 without performing anything therefor.

The key event delivery section 18 notifies the key event(s) notified from the key event conversion section 20 to the grab window 10. By writing the key event(s) to an event queue for the grab window 10, for example, event delivery is achieved.

Based on the notification from the key event acquiring section 30, the key event deletion section 26 deletes a specific key event which is retained in the key event retaining section 24, when triggered by the acquisition of a specific key event by the key event controlling apparatus 12.

For instance, in the case where key event b is to be deleted when triggered by the acquisition of key event a, the key event deletion section 26 will delete key event b from the key event retaining section 24, if it is retained therein, when the acquisition of key event a is notified from the key event acquiring section 30. If key event b is not retained in the key event retaining section 24, the key event deletion section 26 does not perform anything. It would also be possible to designate a plurality of key events to be deleted, e.g., deleting key events b and c when key event a is acquired.

Such key event deletion rules are set when it is necessary to cancel a previous key event when a specific key event is acquired. For instance, in the case where a short-pressed key event and a long-pressed key event are to be notified in response to a short press and a long press of a key, respectively, it would be necessary, when a long-pressed key press event has been acquired, to cancel the short-pressed key press event which was immediately previously notified. Therefore, a rule is set which states that a short-pressed key press event is to be deleted when triggered by a long-pressed key press event. Similarly, a rule is set which states that a short-pressed key release event is to be deleted when a long-pressed key release event is acquired. In the case where there are release and key press event types, by deleting the key release event retained in the key event retaining section 24 when a key press event is acquired, malfunctioning due to a release event remaining in the key event retaining section 24 which was issued for a previous key operation can be prevented.

If the key event controlling apparatus 12 has not acquired any key events for a certain period of time, the retained content clearing section 28 deletes all of the key events retained in the key event retaining section 24. The retained content clearing section 28 has a timer for measuring an amount of time for which no key events have been acquired, and is implemented by resetting the timer each time the key event controlling apparatus 12 acquires a key event based on a notification from the key event acquiring section 30, and clearing the content retained in the key event retaining section 24 when the timer's time has exceeded a predetermined value which is previously set.

Hereinafter, a specific example will be described. In the case where a short-pressed key event and a long-pressed key event are to be notified in response to a short press and a long press of a key, respectively. The key operation cannot be ascertained with a short-pressed key press event alone because a long press operation might thereafter be performed. A short press operation can only be ascertained when both a short-pressed key press event and a short-pressed key release event are secured. Therefore, a key event ascertainment having the two constituents, a short-pressed key press event and a short-pressed key release event, is set in the delivered key event determining section 22. The delivered key event determining section 22 compares the key event retained by the key event retaining section 24 and the key event ascertainment set which has been set. If all of the key events belonging to a given key event ascertainment set are retained in the key event retaining section 24, ascertains those key events as the key events to be delivered.

For instance, in the case where there are three key events a, b, and c, and a pair X consisting of key event a and key event b and a pair Y consisting of key event a and key event c are set as key event ascertainment sets, the delivered key event determining section 22 does not perform anything while only key event a is retained in the key event retaining section 24. Thereafter, when key event b becomes additionally retained in the key event retaining section 24, key events a and b belonging to key event ascertainment set X are all being retained. Therefore, key events a and b are ascertained as the key events to be delivered; these key events a and b are deleted from the key event retaining section 24; and these key events a and b are notified to the key event conversion section 20. Similarly, if key event c is added to the retained content when key event a is retained, key event a and c belonging to the key event ascertainment set Y have all been secured, and therefore key events a and c are ascertained as the key events to be delivered. If key event a is added to the retained content when key events b and c are retained, the key events belonging to which key event ascertainment set X or Y are to be delivered is determined by a method of making a pair consisting of one of key events b and c that was the first to be retained and key event a, or by a method of assigning priorities to the key event ascertainment sets.

In the case where there are four key events a, b, c, and d, and a pair X consisting of key event a and key event b and a pair Y consisting of key event a and key event c are set as key event ascertainment sets, key events a, b, and c, which are the constituents of pairs X and Y, are retained in the key event retaining section 24, but key event d is notified to the key event delivery section 18, via the key event conversion section 20, without being retained in the key event retaining section 24.

As mentioned earlier as a problem to be solved, if it is necessary to immediately notify a change in the state of a key to the grab window 10, such can be realized by deactivating the key event ascertainment set to which the key event that is desired to be immediately acquired belongs. Referring to the above example, if key event b is desired to be immediately acquired, by deactivating key event ascertainment set X, key event b can be notified to the key event delivery section 18, via the key event conversion section 20, without being retained in the key event retaining section 24, and notified from the key event delivery section 18 to the grab window 10.

Figure 8:
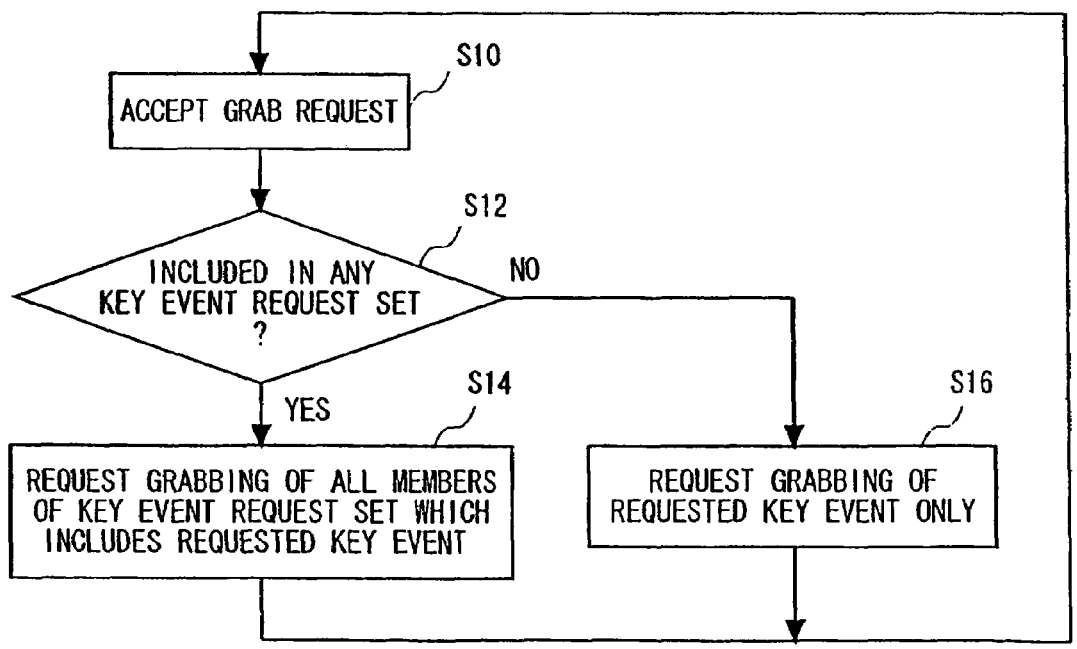
FIG. 8 is a flowchart illustrating a flow of a key event grab requesting process according to Embodiment 1 of the present invention.

Next, a flow of a key event grab requesting process according to Embodiment 1 of the present invention will be described with reference to the flowchart of FIG. 8.

First, the grab accepting section 14 accepts a key event which has been requested by the grab window 10 to be grabbed, stores this request, and notifies to the grab requesting section 16 that a request has been accepted (S10).

Next, the grab requesting section 16 acquires the type of the key event which has been requested to be grabbed, and checks whether that key event is included in any of the key event request sets which are retained in the grab requesting section 16 (S12). If the key event is included in any of the key event request sets (S12, YES), the grab requesting section 16 places a request to the window system 32 to grab all of the constituents of the key event request set in which the key event is included (S14). On the other hand, if the key event is not included in any of the key event request sets (S302, NO), the grab requesting section 16 places a request to the window system 32 to grab only that key event (S16).

Next, a flow of a key event filtering process according to Embodiment 1 will be described with reference to the flowchart of FIG. 9.

First, the key event acquiring section 30 acquires a key event from the window system 32, notifies the acquired key event to the delivered key event determining section 22, and notifies to the retained content clearing section 28 and the key event deletion section 26 that a key event has been acquired (S18). Then, the retained content clearing section 28 resets the timer (S20). If a key event which will trigger a deletion is acquired, the key event deletion section 26 checks whether a key event to be deleted is retained in the key event retaining section 24 (S22), and if such is retained (S22, YES), the key event deletion section 26 deletes the key event to be deleted from the key event retaining section 24 (S24).

Next, the delivered key event determining section 22 checks whether the acquired key event alone results in the ascertainment of the operation, or in other words, whether the key operation cannot be ascertained until another key event is notified (S26). This is determined based on whether the acquired key event is included in any of the key event ascertainment sets which are set in the delivered key event determining section 22. If the acquired key event is included in none of the key event ascertainment sets (S26, YES), process proceeds to step S38. On the other hand, if the acquired key event is included in any of the key event ascertainment sets (S26, NO), the acquired key event is retained in the key event retaining section 24 (S28).

Next, the delivered key event determining section 22 checks, among the key event ascertainment sets which are set, whether there is any pair (key event ascertainment set) all of whose constituent key events are retained in the key event retaining section 24 (S30). If such a pair exists, all of the key events belonging to that pair are determined as the key events to be delivered, and these key events to be delivered are notified to the key event conversion section 20 (S32). Thereafter, the key event conversion section 20 checks whether there exists any rule for converting these key events to be delivered (S34), and if such a rule is found, converts these key events to be delivered according to that rule (S36).

To the grab window 10, the key event delivery section 18 delivers: the key event which was determined by the check of step S26 as not being included in any of the key event ascertainment sets; the converted key events to be delivered, if conversion was applied at step S36; or the key events to be delivered as determined at S32, if conversion of step S36 was not applied (S38).

Figure 9:
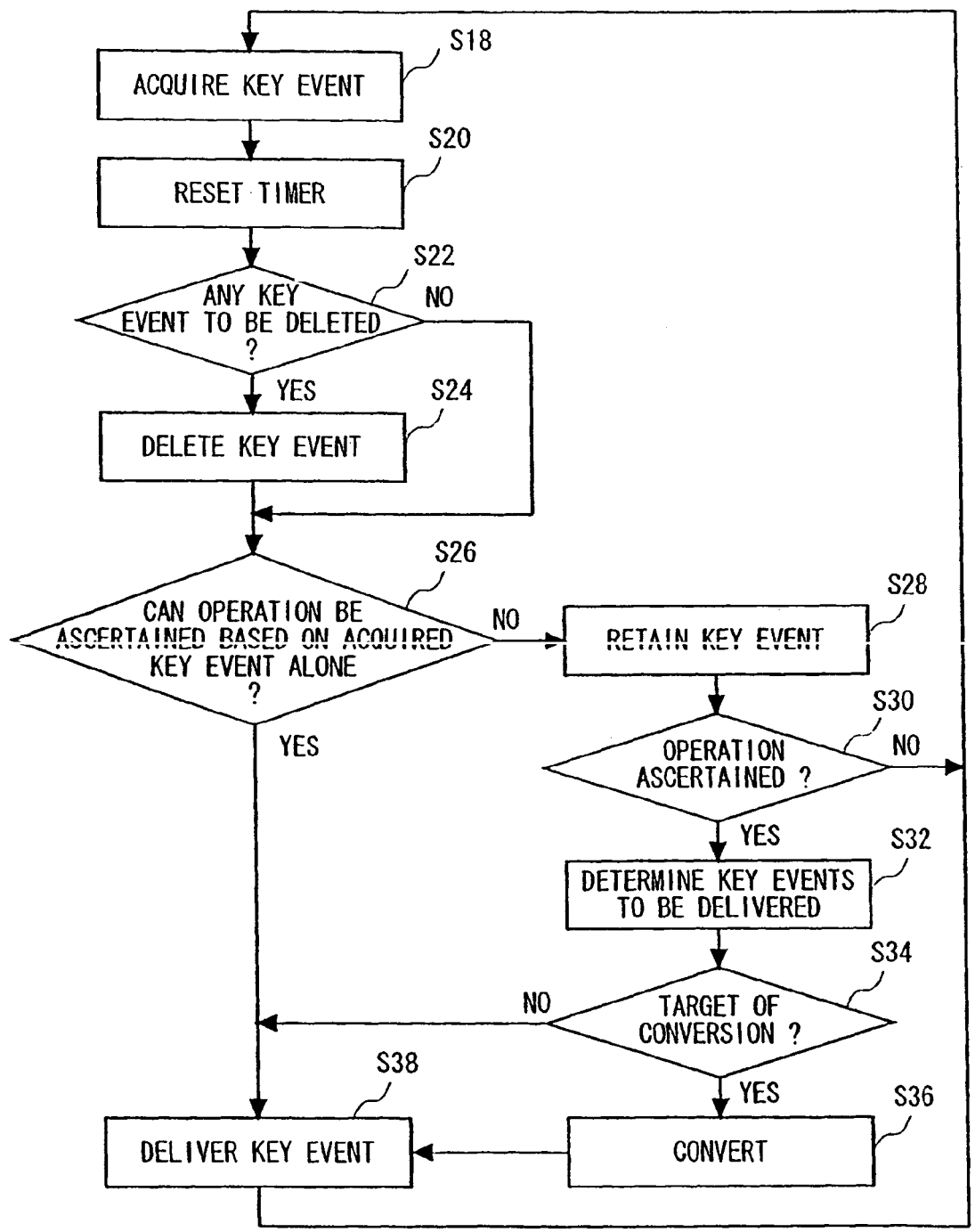
FIG. 9 is a flowchart illustrating a flow of a key event filtering process according to Embodiment 1 of the present invention.

Although not shown in the flowchart of FIG. 9, the retained content clearing section 28 clears the content retained in the key event retaining section 24 if the count value of the timer which measures the amount of time for which no key events have been notified from the window system 32 to the key event controlling apparatus 12 exceeds a predetermined value.

As described above, since the key event controlling apparatus 12 temporarily retains, as necessary, the key events which are issued from the window system 32 during a key operation, and notifies key events to the grab window 10 after the key operation is ascertained, malfunctioning due to the key events that are issued during a key operation can be prevented.

In the case where it is necessary to immediately notify a change in the state of a key to the grab window 10, such can be realized by deactivating a key event ascertainment set(s) which is set in the delivered key event determining section 22.

The retained content clearing section 28 and the key event conversion section 20 may be omitted if unnecessary.

It is also possible to realize a function which is equivalent to that of the key event deletion section 26, without providing the key event deletion section 26. In that case, a deliverable/undeliverable flag, designating which key event is to be delivered and which key event is not to be delivered when all of the key events belonging to a key event ascertainment set have been secured, is added to each piece of key event information 48 composing the key event ascertainment set. Then, when all of the key events belonging to the key event ascertainment set 102 have been secured in the key event retaining section 24 (S30, YES), the delivered key event determining section 22 determines, at S32, only those whose deliverable/undeliverable flags indicate "deliverable" as the key events to be delivered, and deletes those indicated as "undeliverable" from the key event retaining section 24. As a result, without providing the key event deletion section 26, the key events which are generated during a key operation can be suppressed, and it is possible to deliver only the key events which define the key operation result.

EMBODIMENT 2

As Embodiment 2 of the present invention, an exemplary key event controlling apparatus which performs a different key event filtering process from that of Embodiment 1 will be described.

Figure 10:
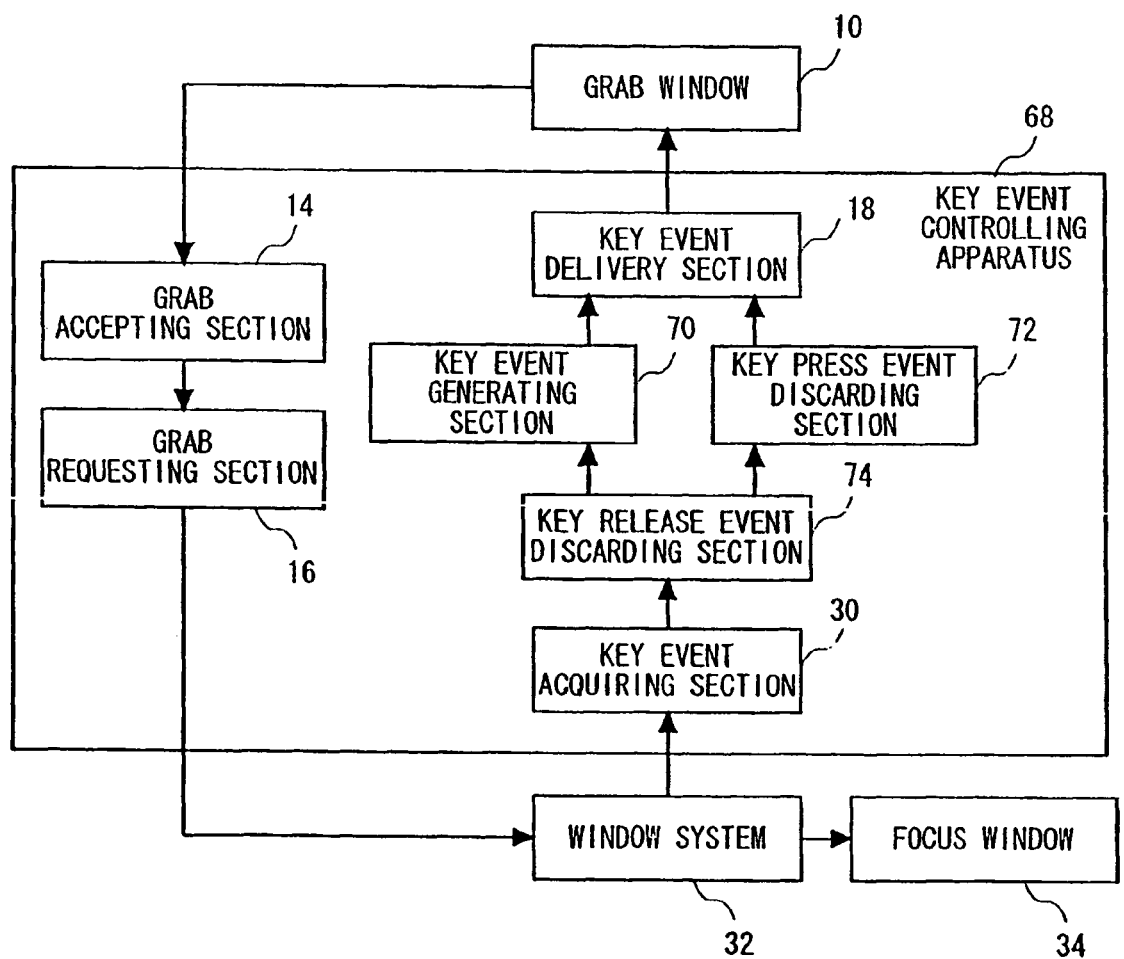
FIG. 10 is a block diagram illustrating an exemplary configuration of a key event controlling apparatus according to Embodiment 2 of the present invention.

FIG. 10 is a block diagram illustrating an exemplary configuration of a key event controlling apparatus according to Embodiment 2 of the present invention. In FIG. 10, component elements which are similar to those shown in FIG. 1 are denoted by like reference numerals, and the descriptions thereof are omitted.

The key event controlling apparatus 68 shown in FIG. 10 comprises a grab accepting section 14, a grab requesting section 16, a key event delivery section 18, a key event generating section 70, a key press event discarding section 72, a key release event discarding section 74, and a key event acquiring section 30.

The grab accepting section 14, the grab requesting section 16, the key event delivery section 18, and the key event acquiring section 30 are similar to those in Embodiment 1, and the descriptions thereof are omitted.

The key release event discarding section 74 internally stores targets to be discarded, and from among the key events which are notified from the key event acquiring section 30, discards any key release events which coincide with the targets of discard. Moreover, as the key release event discarding section 74 discards each key release event, the key release event discarding section 74 designates that key event as no longer a target of discard. In an initial state, there is no target of discard in the key release event discarding section 74. When a key press event (say, an "L key press event") is notified from the key event acquiring section 30, if there exists a key press event (say, an "S key press event") which is to be issued with a press time that is shorter than press time with which the L key press event is issued, the S key release event which is a counterpart of the S key press event is set as a target of discard.

An exemplary process by the key release event discarding section 74 will be described. Assuming that a key press event X0 is generated when a given key X is pressed; a key press event X1 is generated after it remains pressed for a time T1; a key press event X2 is generated after it remains pressed for a time T2 (T1<T2); a key release event X0 is generated when key X is released; a key release event X1 is generated when key X is released after having been pressed for time T1 or more; and a key release event X2 is generated when key X is released after having been pressed for time T2 or more. Then, the key release event discarding section 74 does not perform anything at the time when the key press event X0 is acquired, because there is no key event that could be generated with a press time shorter than that. When the key press event X1 is acquired, since there exists a key press event (key press event X0) that could be generated with a press time shorter than that for the key press event X1, the key release event discarding section 74 sets the corresponding key release event X0 as a target of discard. When the key press event X2 is acquired, since there exist key press events (key press event X0 and key press event X1) that could be generated with a press time shorter than that for the key press event X2, the key release event discarding section 74 sets their corresponding key release event X0 and key release event X1 as targets of discard. Thereafter, when the key release event X0 is acquired, if the key release event X0 has been set as a target of discard, the key release event discarding section 74 discards the key release event X0, and thereafter designates the key release event X0 as no longer a target of discard. Similarly, when the key release event X1 is acquired, if the key release event X1 has been set as a target of discard, the key release event X1 is discarded, and thereafter the key release event X1 is designated as no longer a target of discard.

Upon acquiring from the key release event discarding section 74 any key release event other than the key release event that is to be issued when a given key is released after having been pressed for the longest time, the key event generating section 70 generates a key press event corresponding to that key release event, and notifies it to the key event delivery section 18. Referring to the above example, for key X, the key release event to be issued when it is released after having been pressed for the longest time is the key release event X2. Therefore, the key event generating section 70 generates the key press event X0 when acquiring the key release event X0, and generates the key press event X1 when acquiring the key release event X1. This similarly goes to any other key, for example, if release events for key Y are key release events Y0 to Y4, and if the key release event Y4 is to be generated when the key is released after having been pressed for the longest time, the key event generating section 70 will generate key press events Y0 to Y3, respectively, in response to the acquisition of the key release events Y0 to Y3.

The key press event discarding section 72 discards any key press event other than the key press event to be issued when each key is pressed for the longest time. Referring to the above example, for key X, the key press event to be issued when it is pressed for the longest time is the key press event X2. Therefore, when the key press event X0 and the key press event X1 are acquired, the key press event discarding section 72 discard them. This similarly goes to any other key, for example, if press events for key Y are key press events Y0 to Y4, and if the key press event Y4 is to be generated when it is pressed for the longest time, the key press event discarding section 72 will discard the key press events Y0 to Y3 when they are acquired.

Figure 11:
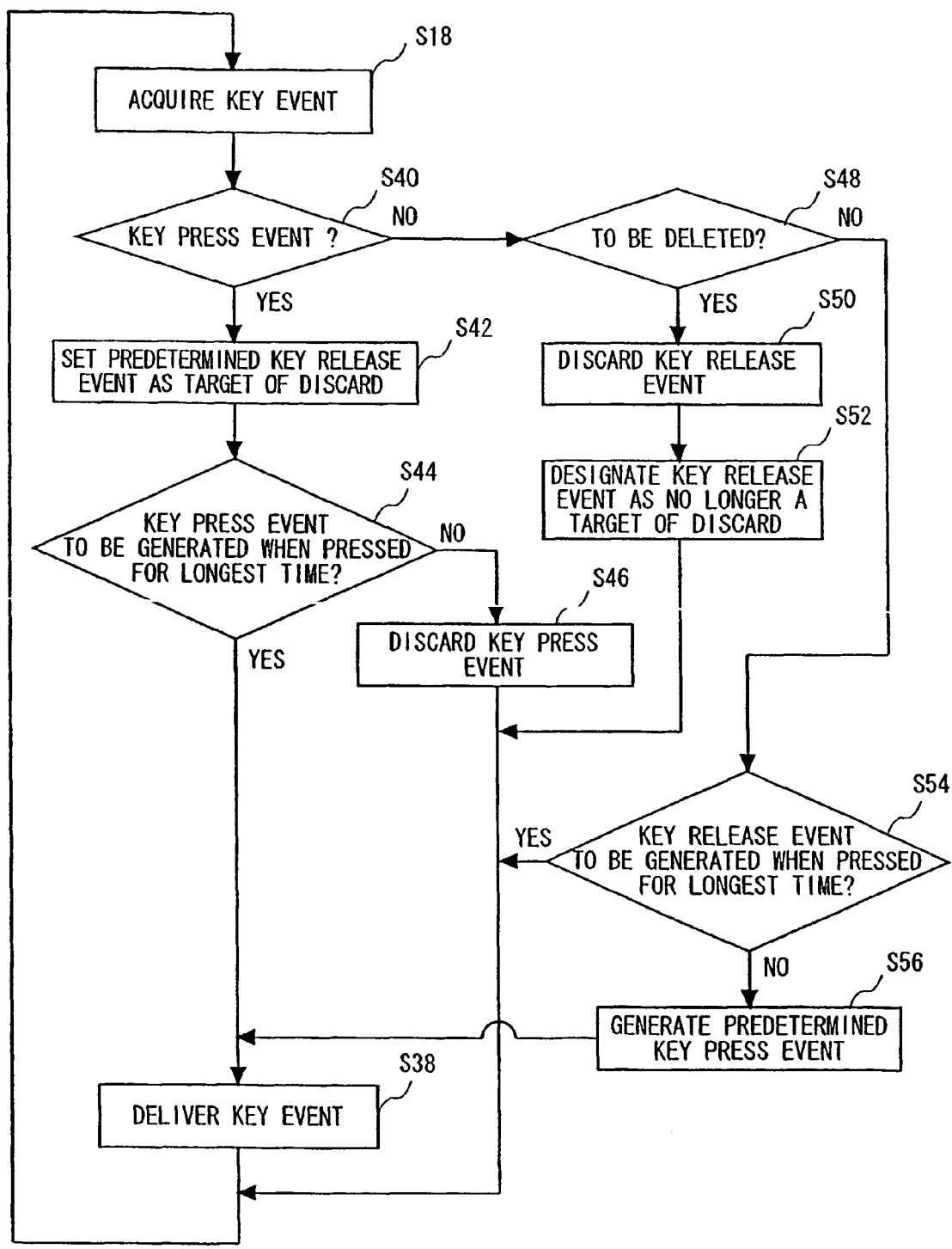
FIG. 11 is a flowchart illustrating a flow of a key event filtering process according to Embodiment 2 of the present invention.

Next, a flow of a key event filtering process by the key event controlling apparatus according to Embodiment 2 of the present invention will be described with reference to the flowchart of FIG. 11. In FIG. 11, any steps similar to those in FIG. 9 are denoted by like reference numerals.

First, the key event acquiring section 30 acquires a key event from the window system 32, and notifies the acquired key event to the key release event discarding section 74 (S18). The key release event discarding section 74 checks whether the acquired key event is a key press event (S40). If it is a key press event (S40, YES), the key release event discarding section 74 sets in itself, as a target of discard, a key release event which is a counterpart of a key press event that could be generated with a press time shorter than that for the key press event, and notifies the acquired key press event to the key press event discarding section 72 (S42). Then, the key press event discarding section 72 checks whether the key press event notified from the key release event discarding section 74 is one that is to be generated when the key is pressed for the longest time (S44). If the key press event is not the one that is to be generated when pressed for the longest time (S44, NO), it is discarded (S46). If the key press event is the one that is to be generated when pressed for the longest time (S44, YES), that key press event is notified to the key event delivery section 18.

On the other hand, if the key event acquired by the key event acquiring section 30 is a key release event (S40, NO), the key release event discarding section 74 checks whether the acquired key release event has been set as a target of discard (S48). If the acquired key release event has been set as a target of discard (S48, YES), the key release event discarding section 74 discards the key release event (S50), and thereafter designates the key release event as no longer a target of discard (S52). On the other hand, if the acquired key release event has not been set as a target of discard (S48, NO), the key release event discarding section 74 notifies the acquired key release event to the key event generating section 70. Then, the key event generating section 70 checks whether the key release event notified from the key release event discarding section 74 is one that is to be generated when the key is pressed for the longest time (S54), and if it is the one that is to be generated when pressed for the longest time (S54, YES), notifies only the key event that has been notified from the key release event discarding section 74 to the key event delivery section 18. If it is not the one that is to be generated when the key is pressed for the longest time (S54, NO), the key event generating section 70 generates a key press event that notifies a pressing of the same key as that corresponding to the notified key release event, and notifies the key event that has been notified from the key release event discarding section 74 and the generated key press event to the key event delivery section 18 (S56).

Lastly, the key event delivery section 18 delivers the key event that has been notified from the key event generating section 70 or the key press event discarding section 72 to the grab window 10 (S38).

Figure 12:
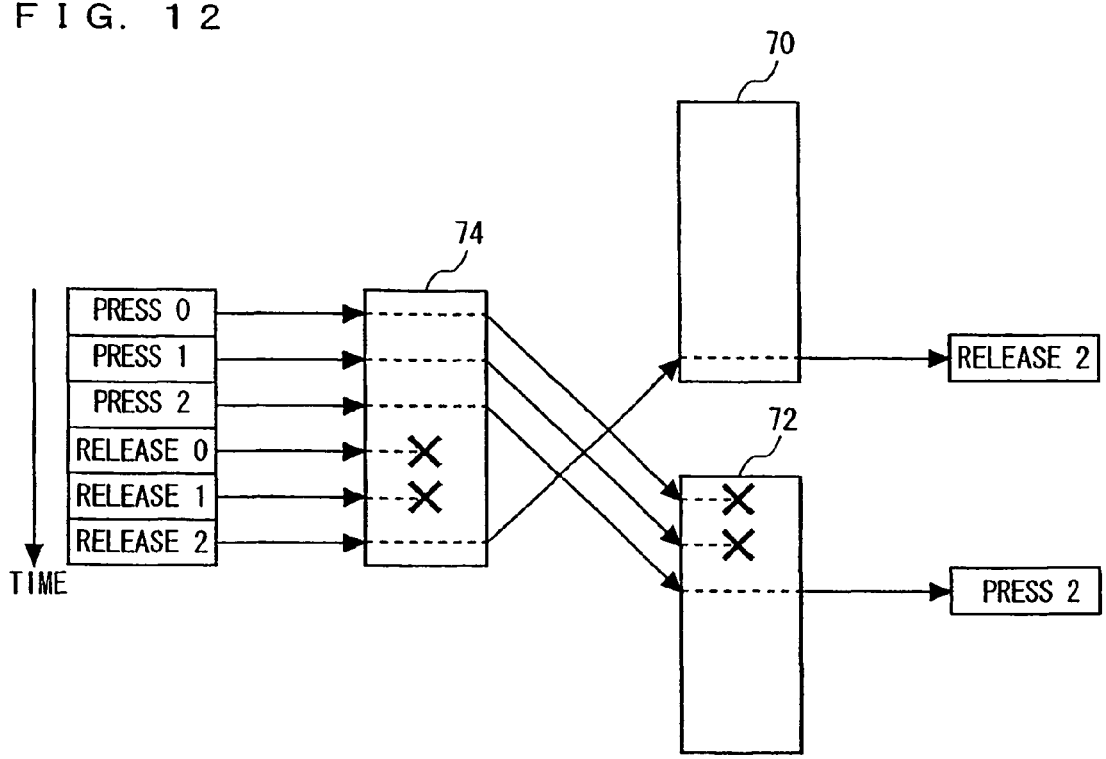
FIG. 12 is a diagram illustrating a specific example of a key event filtering process according to Embodiment 2 of the present invention.
Figure 13:
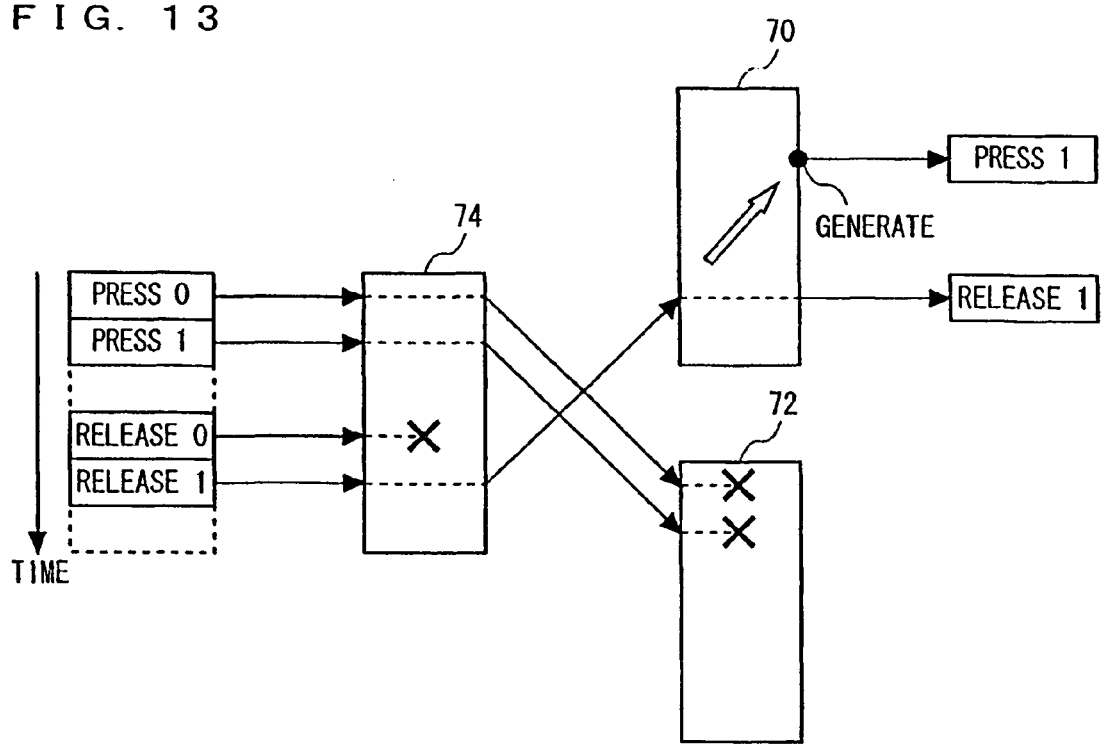
FIG. 13 is a diagram illustrating another specific example of a key event filtering process according to Embodiment 2 of the present invention.
Figure 14:
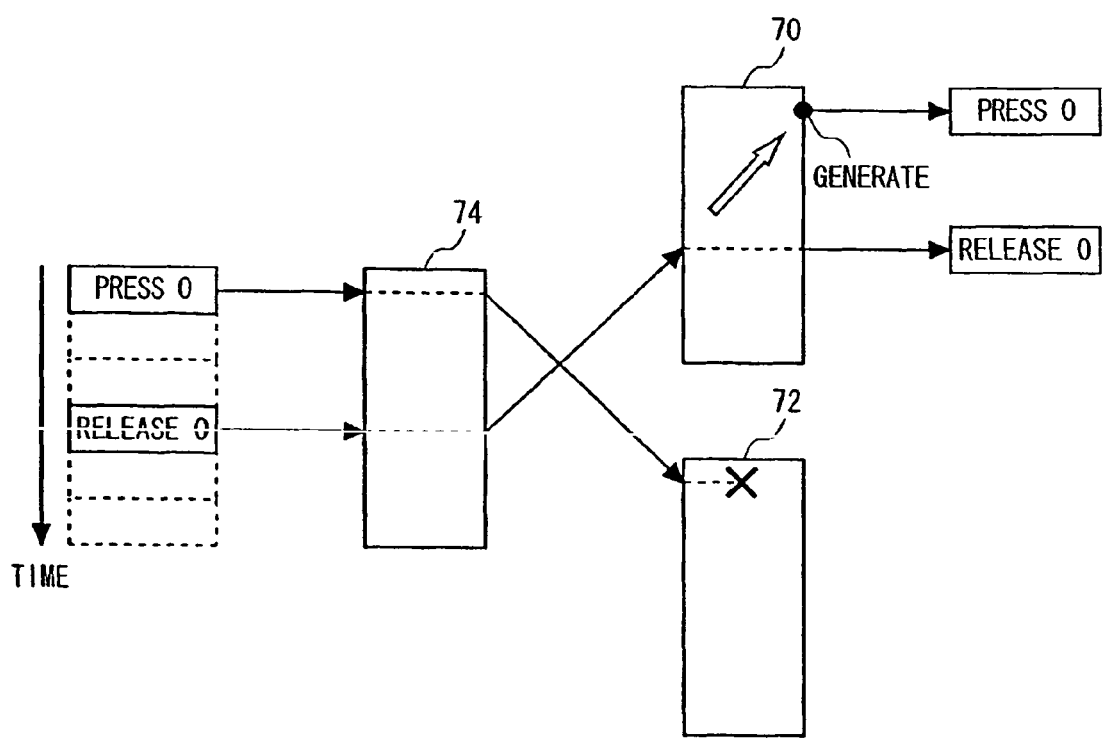
FIG. 14 is a diagram illustrating yet another specific example of a key event filtering process according to Embodiment 2 of the present invention.

Through the above process, for example, in the case where key press and release events are to be issued corresponding to a short press (0), a medium press (1), and long press (2) of a given key, only key events indicating a long press (press 2, release 2) are notified to the key event delivery section 18 if the key is long-pressed, as shown in FIG. 12. Only key events indicating a medium press (press 1, release 1) are notified to the key event delivery section 18 if the key is medium-pressed, as shown in FIG. 13. Further, only key events indicating a short press (press 0, release 0) are notified to the key event delivery section 18 if the key is short-pressed, as shown in FIG. 14.

Thus, in the case where there are two key event types, i.e., release and press, and they are to be notified as events on different keys depending on the length for which a key is pressed, the key event controlling apparatus suppresses the key events which are issued during the key operation, and notifies the ascertained key events when the key operation is ascertained, whereby malfunctioning due to the key events that are issued during a key operation can be prevented.

In the case where it is necessary to immediately notify a change in the state of a key, such can be realized by not utilizing the key event controlling apparatus 12, so that the grab window 10 directly acquires key events from the window system 32.

EMBODIMENT 3

As Embodiment 3 of the present invention, an exemplary key event controlling apparatus which performs a different key event filtering process from those of Embodiments 1 and 2 will be described.

Figure 15:
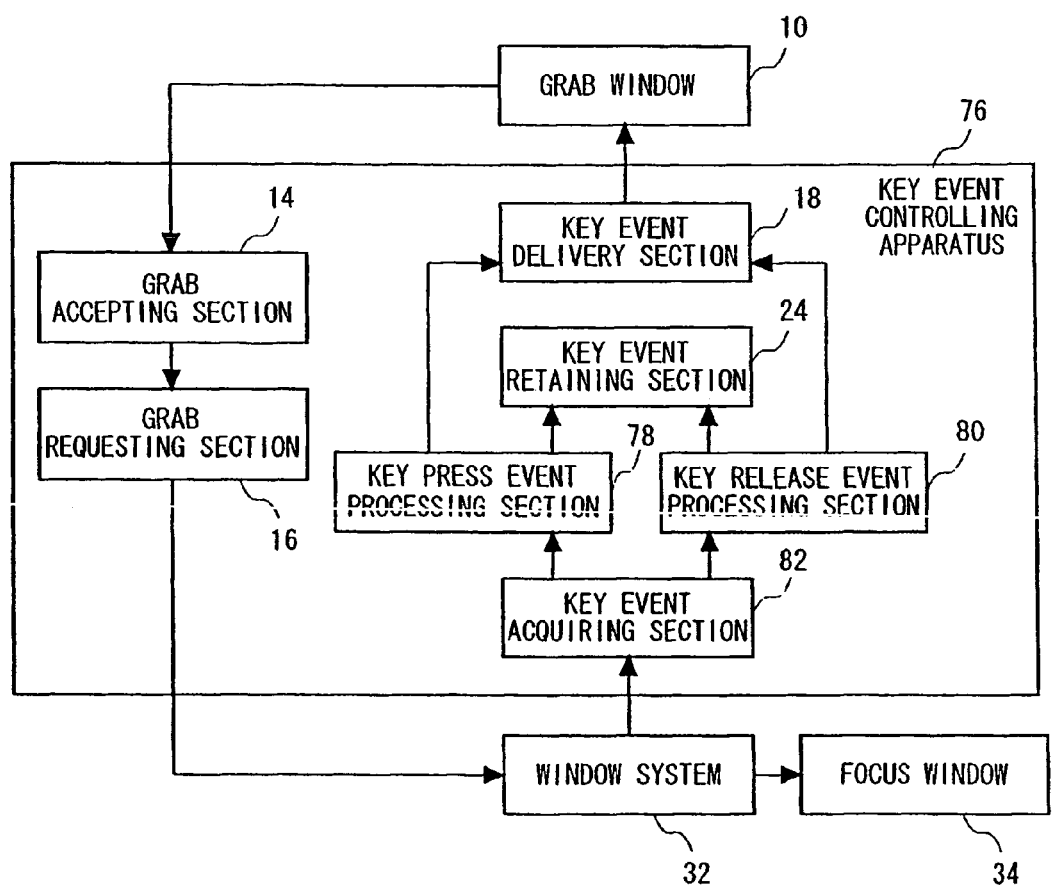
FIG. 15 is a block diagram illustrating an exemplary configuration of a key event controlling apparatus according to Embodiment 3 of the present invention.

FIG. 15 is a block diagram illustrating an exemplary configuration of a key event controlling apparatus according to Embodiment 3 of the present invention. In FIG. 15, component elements which are similar to those shown in FIG. 1 are denoted by like reference numerals, and the descriptions thereof are omitted.

The key event controlling apparatus in FIG. 15 comprises a grab accepting section 14, a grab requesting section 16, a key event delivery section 18, a key event retaining section 24, a key press event processing section 78, a key release event processing section 80, and a key event acquiring section 82.

The grab accepting section 14, the grab requesting section 16, the key event delivery section 18, and the key event retaining section 24 are similar to those in Embodiment 1, and the descriptions thereof are omitted.

The key event acquiring section 82 acquires a key event which is notified from the window system 32, and passes it to the key press event processing section 78 or the key release event processing section 80 depending on the type of the key event. The key press event processing section 78 passes a long-pressed key press event to the key event delivery section 18, and passes a short-pressed key press event to the key event retaining section 24. The key release event processing section 80 passes a long-pressed key release event to the key event delivery section 18. When a short-pressed key release event is received, if a key press event is retained in the key event retaining section 24, the key release event processing section 80 passes this key press event and the received short-pressed key release event to the key event delivery section 18.

Figure 16:
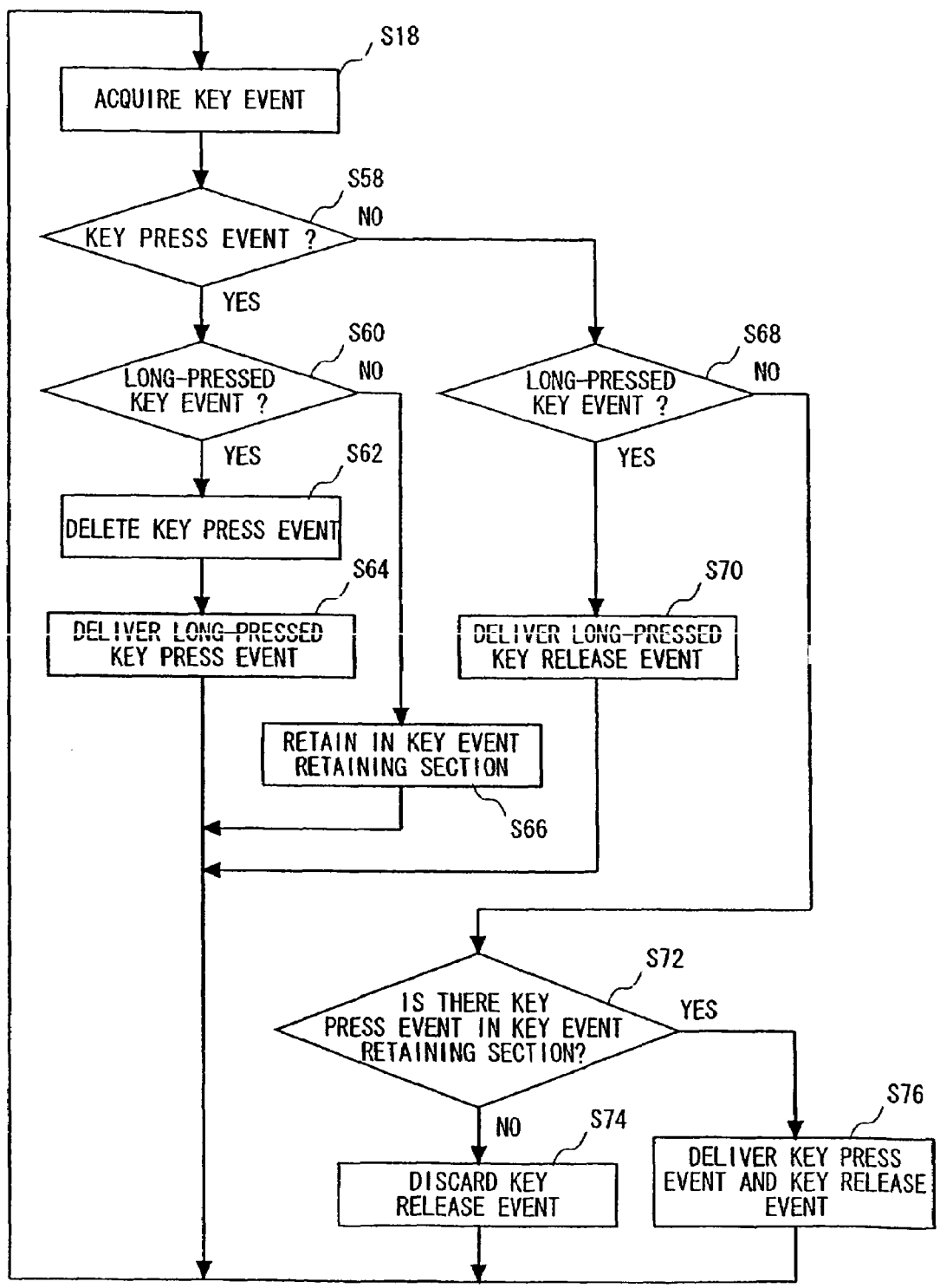
FIG. 16 is a flowchart illustrating a flow of a key event filtering process according to Embodiment 3 of the present invention.

Next, a flow of a key event filtering process by the key event controlling apparatus according to Embodiment 3 of the present invention will be described with reference to the flowchart of FIG. 16. In FIG. 16, any steps similar to those in FIG. 9 are denoted by like reference numerals.

First, the key event acquiring section 82 acquires a key event from the window system 32 (S18), and if the acquired key event is a key press event, passes it to the key press event processing section 78, and if it is a key release event, passes it to the key release event processing section 80 (S58).

If the key event is passed to the key press event processing section 78, the key press event processing section 78 determines whether the key event which has been passed from the key event acquiring section 30 is a long-pressed key press event (S60). If it is not a long-pressed key press event (S60, NO), the key event is stored to the key event retaining section 24 (S66). On the other hand, if the passed key event is a long-pressed key press event (S60, YES), the key press event stored in the key event retaining section 24 is deleted (S62), the long-pressed key press event is passed to the key event delivery section 18, and the key event delivery section 18 delivers the passed key event to the grab window 10 (S64).

If the key event is passed to the key release event processing section 80, the key release event processing section 80 determines whether the key event which has been passed from the key event acquiring section 82 is a long-pressed key release event (S68). If it is not a long-pressed key release event (S68, NO), it is checked whether a key press event is retained in the key event retaining section 24 (S72). If a key press event is retained (S72, YES), the key press event is retrieved from the key event retaining section 24 and passed to the key event delivery section 18, and the key release event passed from the key event acquiring section 82 is also passed to the key event delivery section 18, and the key event delivery section 18 delivers the passed key event to the grab window 10 (S76). On the other hand, if no key press event is retained in the key event retaining section 24 (S72, NO), the key release event which has been passed from the key event acquiring section 82 is discarded (S74). If the key event which has been passed from the key event acquiring section 82 is a long-pressed key release event, the key event is passed to the key event delivery section 18, and the key event delivery section 18 delivers the passed key event to the grab window 10 (S70).

Thus, in the case where there are two key event types, i.e., release and press, and they are to be notified as events on different keys depending on the length for which a key is pressed, the key event controlling apparatus suppresses the key events which are issued during the key operation, and notifies the ascertained key events when the key operation is ascertained, whereby malfunctioning due to the key events that are issued during a key operation can be prevented.

EMBODIMENT 4

An exemplary key event controlling apparatus according to Embodiment 4 of the present invention will be described.

Figure 17:
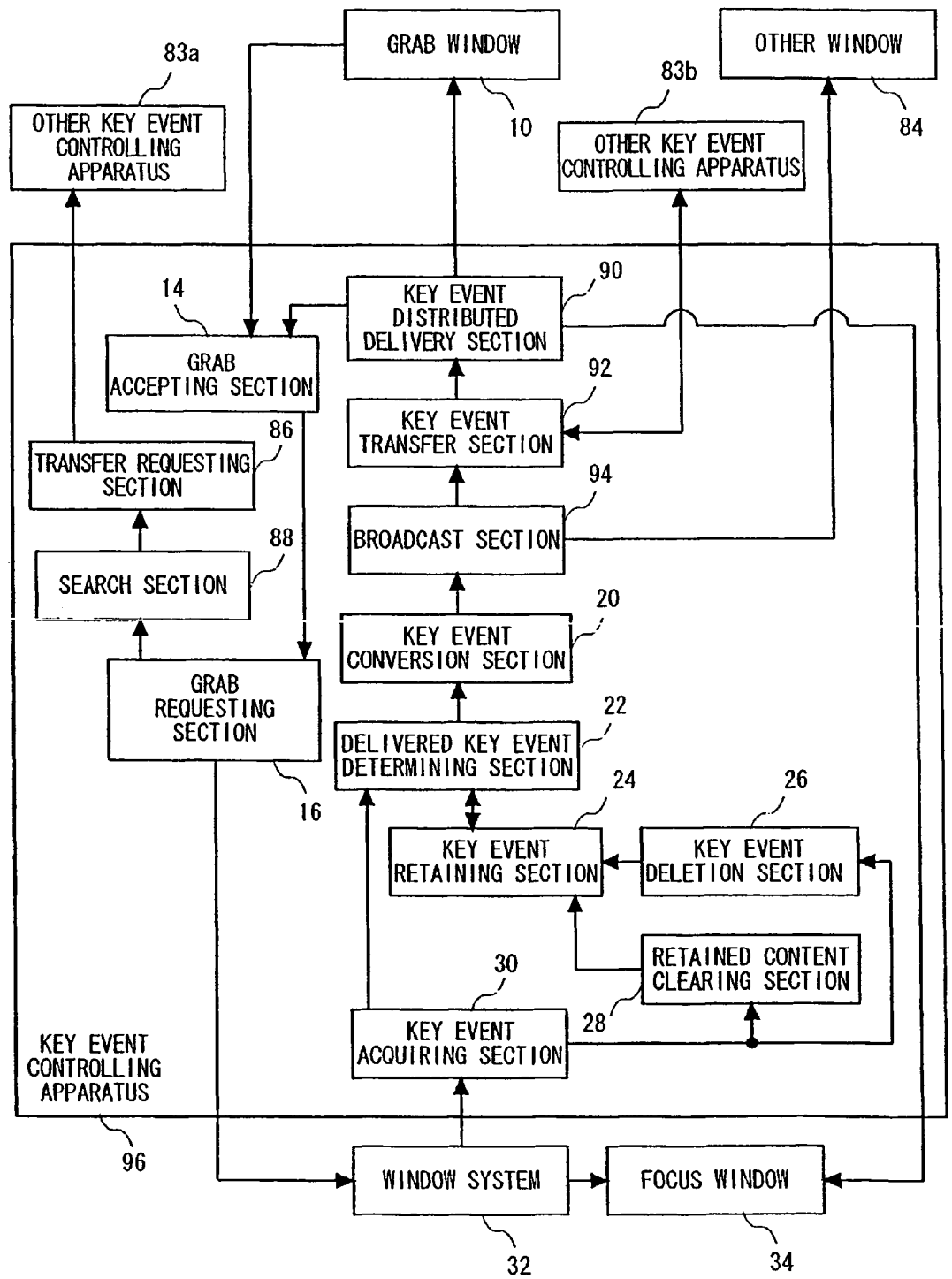
FIG. 17 is a block diagram illustrating an exemplary configuration of a key event controlling apparatus according to Embodiment 4 of the present invention.

FIG. 17 is a block diagram illustrating an exemplary configuration of a key event controlling apparatus according to Embodiment 4 of the present invention. In FIG. 17, component elements which are similar to those shown in FIG. 1 are denoted by like reference numerals, and the descriptions thereof are omitted.

Via the key event controlling apparatus 96, an input key event which has been notified from the window system 32 is notified to a grab window 10, a focus window 34, an other window 84, or other key event controlling apparatuses 83a, 83b. In the case where a plurality of grab windows exist, in order to be able to set attributes (e.g., key event ascertainment sets and key events to be grabbed) of the key event controlling apparatus 96 with respect to each grab window, one key event controlling apparatus is used for each grab window. The other window 84 is another window, which is neither the grab window nor the focus window. The other key event controlling apparatuses 83a, 83b are key event controlling apparatuses other than the key event controlling apparatus 96, and are respectively used by grab windows other than the grab window 10. The grab window 10 may be the focus window 34.

The key event controlling apparatus 96 in FIG. 17 comprises a grab accepting section 14, a transfer requesting section 86, a search section 88, a grab requesting section 16, a key event distributed delivery section 90, a key event transfer section 92, a broadcast section 94, a key event conversion section 20, a delivered key event determining section 22, a key event retaining section 24, a key event deletion section 26, a retained content clearing section 28, and a key event acquiring section 30.

The grab accepting section 14, the grab requesting section 16, the key event conversion section 20, the delivered key event determining section 22, the key event retaining section 24, the key event deletion section 26, the retained content clearing section 28, and the key event acquiring section 30 are similar to those in Embodiment 1, and the descriptions thereof are omitted.

The grab requesting section 16 retains all of a plurality of key events which may be issued until the time a key event corresponding to the user's operation result is ascertained as key event request sets. If a key event which is a target of grabbing that has been notified from the grab accepting section 14 belongs to any of the key event request sets, the grab requesting section 16 places a request to the window system 32 to grab all of the key events belonging to that key event request set. If it is found based on the response from the window system 32 that the key event which was requested to be grabbed has already been grabbed by any other key event controlling apparatus, the grab requesting section 16 notifies so to the search section 88.

Upon receiving a notification from the grab requesting section 16 that the grab request to the window system 32 has failed because the key event requested by the grab window 10 has already been grabbed by any of the other key event controlling apparatuses, the search section 88 searches, among the plurality of other key event controlling apparatuses, for the key event controlling apparatus which has already succeeded in grabbing the key event requested by the grab window 10. A specific example of this search method may be a method of storing an identifier of a key event controlling apparatus which has been successful with its grab request in a shared memory or the like, and making an inquiry to the shared memory, a method of broadcasting a search request for all key event controlling apparatuses when performing a search and obtaining responses thereto, or the like.

The transfer requesting section 86 requests the key event controlling apparatus which has already succeeded in grabbing (herein assumed to be the other key event controlling apparatus 83a), as found by the search section 88, to allow the key event for which the grab window 10 has requested grabbing to be transferred to the key event acquiring section 30 of the key event controlling apparatus 96. The notification of this transfer request is realized by using an event transmission function provided by the window system, e.g., XSendEvent in the case of XWindowSystem, a shared memory, or the like.

The broadcast section 94 retains the types of key events to be broadcast, and when a key event to be broadcast is acquired from the key event conversion section 20, broadcasts that key event to all of the windows which are currently in existence.

Upon receiving a transfer request from the transfer requesting section of the other key event controlling apparatus 83b, the key event transfer section 92 stores the requested key event and the identifier of the key event controlling apparatus 83b which has made the request, and upon acquiring the requested key event, transfers that key event to the key event controlling apparatus 83b which has made the request.

The key event distributed delivery section 90 delivers the key event(s) to be delivered as determined by the delivered key event determining section 22 (or the key events after conversion if the key event(s) to be delivered were converted by the key event conversion section 20) to the grab window 10 and the focus window 34. The key event distributed delivery section 90 notifies the key event for which the grab accepting section 14 accepted a request from the grab window 10 to the grab window 10, and any other key events to the focus window 34. The determination of the focus window is realized by a focus window acquiring function of the window system, e.g., XGetWindowFocus in the case of XwindowSystem.

Figure 18:
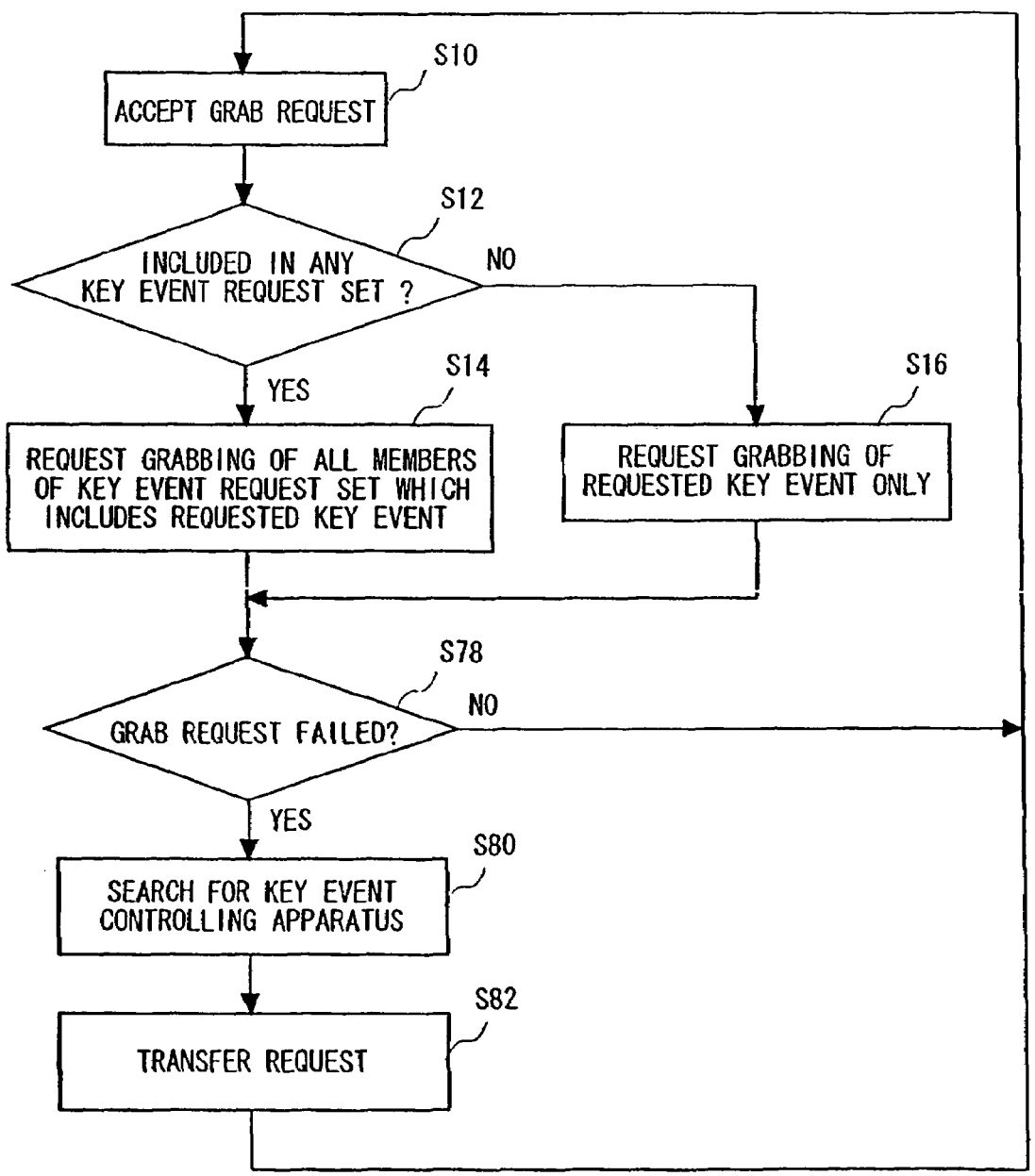
FIG. 18 is a flowchart illustrating a flow of a key event grab requesting process according to Embodiment 4 of the present invention.
Figure 19:
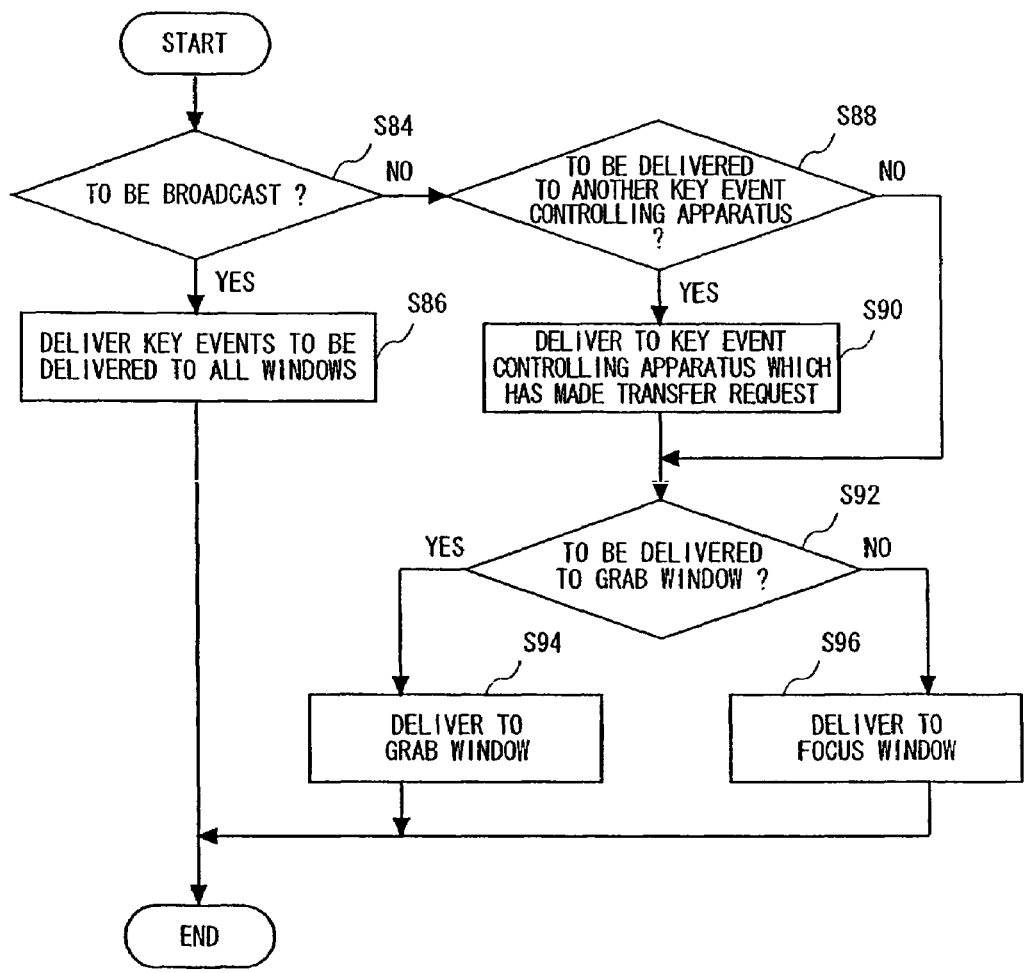
FIG. 19 is a flowchart illustrating a flow of a key event delivering process according to Embodiment 4 of the present invention.

Next, a flow of a key event grab requesting process according to Embodiment 4 of the present invention will be described with reference to the flowchart of FIG. 18. In FIG. 18, any steps similar to those in FIG. 8 are denoted by like reference numerals, and the descriptions thereof are omitted.

Step S10, step S12, step S14, and step S16 are similar to those in Embodiment 1.

After placing a request to the window system 32 to grab a key event at step S14 or step S16, the grab requesting section 16 checks the result of the grab request (S78). If the grab request has failed because the requested key event has already been grabbed by another key event controlling apparatus (S78, YES), the grab requesting section 16 notifies the search section 88 of the failure. In response to this notification, the search section 88 searches for the key event controlling apparatus which has grabbed the requested key event (S80).

Lastly, the transfer requesting section 86 notifies a transfer request to the key event controlling apparatus found by the search section 88 (herein assumed to be the other key event controlling apparatus 83a) to transfer the key event for which a grab request has been made by the grab window 10, thereby ending the process (S82).

Next, the process of key event acquisition according to Embodiment 4 will be described. In Embodiment 4, the process of step S111 in FIG. 6 differs from that in Embodiment 1. The processes after a key event is acquired and until key events to be delivered are determined are similar to S101 to S110 in FIG. 6, and the descriptions thereof are omitted.

FIG. 10 shows a flowchart of the key event delivering process according to Embodiment 4. First, the broadcast section 94 checks a key event to be delivered, as received from the key event conversion section 20, to determine whether it is included among the internally-stored types of key events which are to be broadcast (S84). If the key event to be delivered is included among those to be broadcast (S84, YES), the broadcast section 94 delivers the key event to be delivered to all of the windows displayed by the window system 32, thereby ending the process (S86).

On the other hand, if the key event to be delivered is not included among those to be broadcast (S84, NO), the broadcast section 94 notifies the key event to be delivered to the key event transfer section 92. Upon receiving the notification, the key event transfer section 92 checks whether a transfer request for the received key event to be delivered is being made from another key event controlling apparatus (S88). If a transfer request for the key event to be delivered is being made (S88, YES), the key event transfer section 92 transfers the key event to be delivered to the key event controlling apparatus which has made the transfer request (herein assumed to be the other key event controlling apparatus 83b), and notifies this key event to be delivered to the key event distributed delivery section 90 (S90). Next, the key event distributed delivery section 90 checks the key event to be delivered received from the key event transfer section 92 to check whether it is included among the types of key events requested by the grab window 10 (S92). If the key event to be delivered has been requested to be grabbed by the grab window 10 (S92, YES), the key event distributed delivery section 90 transfers the key event to be delivered to the grab window 10 (S94). On the other hand, if the key event to be delivered has not been requested to be grabbed by the grab window 10 (S92, NO), the key event distributed delivery section 90 delivers the key event to be delivered to the focus window 34 (S96).

As described above, by transferring key events between key event controlling apparatuses, it becomes possible for a plurality of windows to grab the same key event at the same time.

The broadcast section 94, the search section 88, and the transfer requesting section 86 may be omitted if unnecessary.

In the present embodiment, the elements related to the key event filtering process described in Embodiment 1 (i.e., the key event conversion section 20, the delivered key event determining section 22, the key event retaining section 24, the key event deletion section 26, and the retained content clearing section 28) may be replaced by those described in Embodiment 2 (i.e., the key event generating section 70, the key press event discarding section 72, and the key release event discarding section 74).

EMBODIMENT 5

An exemplary key event controlling apparatus according to Embodiment 5 of the present invention will be described.

Figure 20:
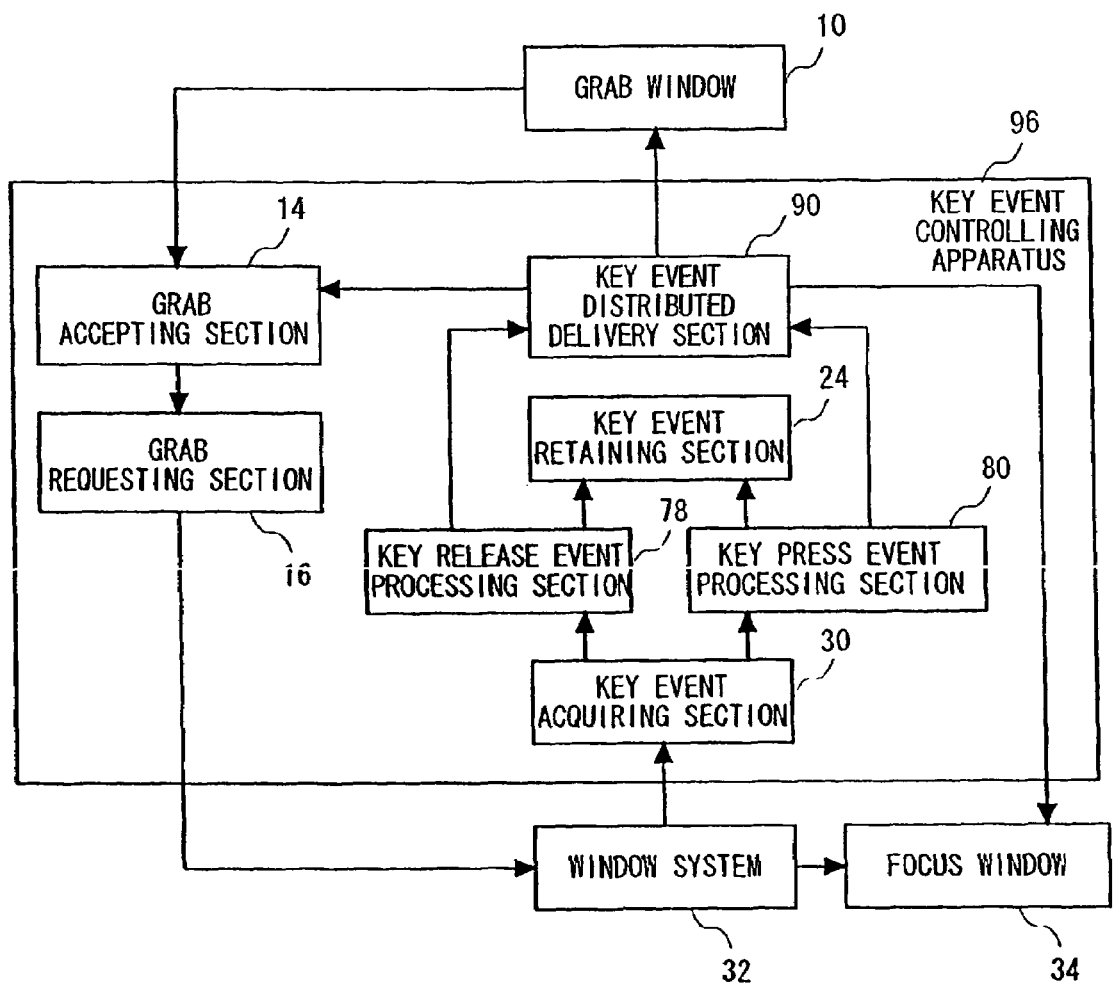
FIG. 20 is a block diagram illustrating an exemplary configuration of a key event controlling apparatus according to Embodiment 5 of the present invention.

FIG. 20 is a block diagram illustrating an exemplary configuration of a key event controlling apparatus according to Embodiment 5 of the present invention. In FIG. 20, component elements which are similar to those shown in FIG. 1 and FIG. 17 are denoted by like reference numerals, and the descriptions thereof are omitted.

Embodiment 5 differs from Embodiment 3 in that a key event distributed delivery section 90 is provided instead of a key event delivery section 18. The key event distributed delivery section 90 inquires the grab accepting section 14 as to whether a key event passed from the key release event processing section 78 or the key press event processing section 80 has been requested to be grabbed by the grab window 10, and if it has been requested to be grabbed, delivers the key event to the grab window 10. On the other hand, if the passed key event has not been requested to be grabbed by the grab window 10, the key event is delivered to the focus window 34.

The key event controlling apparatus in each of Embodiments 1 to 5 above can typically be implemented by using a computer comprising a calculation unit and storage devices such as a hard disk and RAM, and a program for causing the computer to execute the processes of the respective steps of the above-described flowcharts. The program may be pre-stored on a storage device, or may be provided to the calculation unit via any recording medium such as a CD-R or a DVD.

According to the present invention, malfunctioning in the case where only predetermined ones of key events that are issued from a window system are to be precedentially delivered to a particular window can be prevented, for example.

The invention claimed is:

1. A key event controlling apparatus for acquiring a key event that indicates a result of a key operation from a key delivering device that notifies a change in a state of a key, and for delivering the acquired key event to a predetermined recipient program, the key event controlling apparatus comprising:

a grab accepting section for accepting, from a first recipient program, a request to grab a desired key event, rather than accepting a request from a second recipient program that is a usual recipient of key events from the key delivering device;

a grab requesting section for requesting, in accordance with the request from the first recipient program accepted by the grab accepting section, the key delivering device to deliver, to the key event controlling apparatus, all key events belonging to a key event request set that includes the desired key event, rather than in accordance with the request from the second recipient program, the key event request set being previously stored by the grab requesting section and including a plurality of key events to be issued until a time at which a key event corresponding to a result of an operation by a user is ascertained;

a key event retaining section for retaining any one key event that alone would not allow the operation of the user to be ascertained, the any one key event being retained from a plurality of key event notified from the key delivering device;

a delivered key event determining section for (i) retaining one key event ascertainment set that includes a plurality of key events that are together necessary for ascertaining a specific key operation, and (ii) for determining that all of the key events included in the key event ascertainment set are to be delivered, the determination being made when all of the key events included in the key event ascertainment set are retained in the key event retaining section; and a key event deletion section for, upon receiving a notification of a predetermined key event from the key delivering device, deleting a predetermined key event retained in the key event retaining section.

2. The key event controlling apparatus according to claim 1, further comprising a key event conversion section for converting the key events to be delivered to a predetermined key event before the key events to be delivered are notified to the key event delivery section.

3. The key event controlling apparatus according to claim 1, further comprising a retained content clearing section for, when no key events are notified from the key delivering device to the key event controlling apparatus for a certain period of time, deleting the key events retained in the key event retaining section.

4. The key event controlling apparatus according to claim 1, wherein the key delivering device is a window system.

5. A key event controlling method for acquiring a key event that indicates a result of a key operation from a key delivering device that notifies a change in a state of a key, and for delivering the acquired key event to a predetermined recipient program, the key event controlling method comprising:

a grab accepting step of accepting, from a first recipient program, a request to grab a desired key event, rather than accepting a request from a second recipient program that is a usual recipient of key events from the key delivering device;

a grab requesting step of requesting, in accordance with the request from the first recipient program accepted in the grab accepting step, the key delivering device to deliver, to a key event controlling apparatus, all key events belonging to a key event request set that includes the desired key event, rather than in accordance with the request from the second recipient program, the key event request set being previously stored and including a plurality of key events to be issued until a time at which a key event corresponding to a result of an operation by a user is ascertained;

a key event retaining step of retaining any one key event that alone would not allow the operation of the user to be ascertained, the any one key event being retained from a plurality of key events notified from the key event delivering device;

a delivered key event determining step of (i) referring to a key event ascertainment set that is previously stored and includes a plurality of key events that are together necessary for ascertaining a specific key operation, and (ii) determining that all of the key events included in the key event ascertainment set are to be delivered, the determination being made when all of the key events included in the key event ascertainment set are retained in the key event retaining step; and a key event deletion step of upon receiving a notification of a predetermined key event from the key delivering device, deleting a predetermined key event retained in the key event retaining step.

6. A storage device having a key event controlling program recorded thereon, the key event controlling program for acquiring a key event that indicates a result of a key operation from a key delivering device that notifies a change in a state of a key, and for delivering the acquired key event to a predetermined recipient program, the key event controlling program causing a computer to execute a method comprising:

a grab accepting step of accepting, from a first recipient program, a request to grab a desired key event, rather than accepting a request from a second recipient program that is a usual recipient of key events from the key delivering device;

a grab requesting step of requesting, in accordance with the request from the first recipient program accepted in the grab accepting step, the key delivering device to deliver, to a key event controlling apparatus, all key events belonging to a key event request set that includes the desired key event, rather than in accordance with the request from the second recipient program, the key event request set being previously stored and including a plurality of key events to be issued unit a time at which a key event corresponding to a result of an operation by a user is ascertained;

a key event retaining step of retaining any one key event that alone would not allow the operation of the user to be ascertained, the any one key event being retained from a plurality of key events notified from the key event delivering device;

a delivered key event determining step of (i) referring to a key event ascertainment set that is previously stored and includes a plurality of key events that are together necessary for ascertaining a specific key operation, and (ii) for determining that all of the key events included in the key event ascertainment set are to be delivered, the determination being made when all of the key events included in the key event ascertainment set are retained in the key event retaining step; and a key event deletion step of, upon receiving a notification of a predetermined key event from the key delivering device, deleting a predetermined key event retained in the key event retaining step.

7. The key event controlling apparatus according to claim 1, further comprising:

a search section for, when the key events that the grab requesting section has requested the key delivering device to deliver have already been designated by the key delivering device to be precedentially delivered to another key event controlling apparatus, searching for the other key event controlling apparatus;

a transfer requesting section for requesting the other key event controlling apparatus found by the search section to transfer the key events; and a key event transfer section for, when requested by the other key event controlling apparatus to transfer a given key event, transferring the given key event to the other key event controlling apparatus.

8. The key event controlling apparatus according to claim 1, further comprising a broadcast section for delivering a given key event to all recipient programs.

9. The key event controlling apparatus according to claim 1, wherein the key delivering device issues a key press event indicating a pressing of the key and a key release event indicating a release of the key, and issues different key events depending on a length for which the key is pressed, and wherein the key event controlling apparatus further comprises:

a key release event discarding section for, when the key press event is notified from the key delivering device, discarding a key release event that is subsequently issued from the key delivering device and that is a counterpart of another key press event that could be issued with a press time that is shorter than a press time necessary for the key press event to be issued;

a key press event discarding section for discarding any key press event other than the key press event to the issued when the key is pressed for a longest time; and a key event generating section for generating a key press event as a counterpart of a key release event that has not been discarded by the key release event discarding section and that is not the key release event to be issued when the key is pressed for the longest time.

10. The key event controlling apparatus according to claim 1, wherein the key delivering device issues a short-pressed key press event indicating a pressing of the key, issues a short-pressed key release event indicating a release of the key, issues a long-pressed key press event indicating that the key has been long-pressed when the key has been pressed for a certain period of time, and issues a long-pressed key release event when the key is thereafter released, and wherein the key event controlling apparatus further comprises:

a key press event processing section for deleting the key events retained in the key event retaining section when the long-pressed key press event is notified from the key delivering device, and for delivering the long-pressed key press event to the first recipient program;

a key release event processing section for (i), when the long-pressed key release event is acquired, delivering the long-pressed key release event to the first recipient program, (ii), when the short-pressed key release event is acquired and when the short-pressed key release event is retained in the key event retaining section, delivering the short-pressed key press event and the short-pressed key release event to the first recipient program, and (iii), when the short-pressed key release event is acquired and when the short-pressed key press event is not retained in the key event retaining section, discarding the short-pressed key release event.

* * * * *